(12) United States Patent
Naidoo et al.

(10) Patent No.: US 11,092,939 B2
(45) Date of Patent: Aug. 17, 2021

(54) PREVIEW MODE FOR CONFIGURATION LOGIC

(71) Applicant: FISHER-ROSEMOUNT SYSTEMS, INC., Round Rock, TX (US)

(72) Inventors: Julian K. Naidoo, Cedar Park, TX (US); Cristopher Ian Sarmiento Uy, Metro Manila (PH); Prashant Joshi, Leicester (GB); Daniel R. Strinden, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 27 days.

(21) Appl. No.: 16/594,336

(22) Filed: Oct. 7, 2019

(65) Prior Publication Data

US 2021/0103262 A1   Apr. 8, 2021

(51) Int. Cl.
*G06F 3/0484* (2013.01)
*G05B 19/418* (2006.01)
(Continued)

(52) U.S. Cl.
CPC ..... *G05B 19/0426* (2013.01); *G06F 3/04847* (2013.01); *G06F 11/3664* (2013.01); *G06F 3/0482* (2013.01); *G06F 3/0486* (2013.01)

(58) Field of Classification Search
CPC ............. G06F 21/10; G06F 2221/2135; G06F 2221/0737; G06F 2221/2101; G06F 3/04847; G06F 11/3664; G06F 3/0482; G06F 3/0486; H04L 63/20; H04L 67/36; H04L 67/12; Y02P 900/02; Y02P 90/80;
(Continued)

(56) References Cited

U.S. PATENT DOCUMENTS 5,818,736 A   10/1998   Leibold
5,838,563 A   11/1998   Dove et al.
(Continued)

FOREIGN PATENT DOCUMENTS

DE   19740972 C1   3/1999
JP   H09330013 A   12/1997

OTHER PUBLICATIONS

Khadraoui et al., A measurement-based approach for tuning of reduced-order controllers, 6 pages (Year: 2013).*

(Continued)

*Primary Examiner* — Thuy Dao
(74) *Attorney, Agent, or Firm* — Marshall, Gerstein & Borun LLP

(57) ABSTRACT

The described techniques enable plant personnel to avoid the time and labor-intensive process associated with traditional design systems by enabling users to design, test, and "preview" control logic for controlling a process before downloading the control logic to a configuration database or process controller in the plant. This enables the quick testing and improvement of control logic during the design phase, avoiding the time-consuming iterative process of designing, downloading to a database, propagating to a live controller, and testing on the physical controller. It also separates testing of logic and non-logic aspects of a controller configuration, enabling a user to finish designing the control logic before downloading the configuration to the controller, where she only needs to test non-logic aspects of the configuration.

27 Claims, 21 Drawing Sheets

(51) Int. Cl.
*G05B 15/02* (2006.01)
*G06F 3/0482* (2013.01)
*G05B 19/042* (2006.01)
*G06F 11/36* (2006.01)
*G06F 3/0486* (2013.01)

(58) Field of Classification Search
CPC .......... G05B 19/0426; G05B 19/31418; G05B 19/32128; G05B 19/31467; G05B 19/31472
See application file for complete search history.

(56) References Cited

U.S. PATENT DOCUMENTS

| | | | |
|---|---|---|---|
| 6,078,320 A | 6/2000 | Dove et al. | |
| 6,618,630 B1 | 9/2003 | Jundt et al. | |
| 6,687,698 B1 | 2/2004 | Nixon et al. | |
| 7,089,530 B1 | 8/2006 | Dardinski et al. | |
| 7,096,465 B1 | 8/2006 | Dardinski et al. | |
| 7,146,231 B2 | 12/2006 | Schleiss et al. | |
| 8,015,542 B1 | 9/2011 | Parthasarathy et al. | |
| 8,028,275 B2* | 9/2011 | Eldridge | G05B 15/02 717/121 |
| 8,060,222 B2 | 11/2011 | Eldridge et al. | |
| 8,185,871 B2 | 5/2012 | Nixon et al. | |
| 8,527,252 B2 | 9/2013 | Kephart et al. | |
| 9,046,881 B2 | 6/2015 | Blevins et al. | |
| 9,417,626 B2 | 8/2016 | Jones et al. | |
| 9,501,208 B2* | 11/2016 | Jundt | G06F 3/0484 |
| 9,904,263 B2 | 2/2018 | Blevins et al. | |
| 9,904,746 B2 | 2/2018 | McKim et al. | |
| 10,768,598 B2* | 9/2020 | Strinden | G06F 11/3664 |
| 2004/0078182 A1 | 4/2004 | Nixon et al. | |
| 2009/0287321 A1 | 11/2009 | Lucas et al. | |
| 2012/0041570 A1 | 2/2012 | Jones et al. | |
| 2019/0101899 A1 | 4/2019 | Enver | |

OTHER PUBLICATIONS

Search Report for Application No. GB2015550.3, dated May 28, 2021.

* cited by examiner

PREVIEW MODE FOR CONFIGURATION LOGIC

TECHNICAL FIELD

The present disclosure generally relates to process control environment, and, more specifically, to a configuration system that enables a user to design, test, and "preview" control logic for controlling a process before downloading the control logic to a configuration database or process controller in the plant.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network and to one or more instrumentation or field devices via analog, digital or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules cause the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, typically are communicatively disposed between a controller and one or more field devices, enabling communications there between (e.g. by converting electrical signals into digital values and vice versa). Typically, an I/O card functions as an intermediary node between a process controller and one or more field devices inputs or outputs configured for the same communication protocol or protocols as those utilized by the I/O card. Specifically, field device inputs and outputs are typically configured for either analog or discrete communications. In order to communicate with a field device, a controller generally needs an I/O card configured for the same type of input or output utilized by the field device. That is, for a field device configured to receive analog control output signals (e.g., a 4-20 mA signal), the controller needs an analog output (AO) I/O card to transmit the appropriate analog control output signal; and for a field device configured to transmit measurements or other information via an analog signal, the controller typically needs an analog input (AI) card to receive the transmitted information. Similarly, for a field device configured to receive discrete control output signals, the controller needs a discrete output (DO) I/O card to transmit the appropriate discrete control output signal; and for a field device configured to transmit information via a discrete control input signal, the controller needs a discrete input (DI) I/O card. Generally, each I/O card can connect to multiple field device inputs or outputs, wherein each communication link to a particular input or output is referred to as a "channel." For example, a 120 channel DO I/O card can be communicatively connected to 120 distinct discrete field device inputs, enabling the controller to transmit (via the DO I/O card) discrete control output signals to the 120 distinct discrete field device inputs.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object-oriented programming protocol (i) perform functions within the control scheme based on inputs thereto and (ii) provide outputs to other function blocks within the control scheme. The configuration application may also allow a configuration designer to create or change operator interfaces which are used by a viewing application to display data to an operator and to enable the operator to change settings, such as set points, within the process control routines.

Each dedicated controller (and, in some cases, one or more field devices) stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In addition to process controllers, I/O cards, and field devices, a typical process control system includes many other supporting devices which are also necessary for, or related to, process operation. These additional devices include, for example, power supply equipment, power generation and distribution equipment, rotating equipment such as turbines, etc., which are located at numerous places in a typical plant.

Still further, many process plants have other computers associated therewith which execute applications related to business functions or maintenance functions. For example, some plants include computers that execute applications associated with ordering raw materials, replacement parts or devices for the plant, applications related to forecasting sales and production needs, etc. Likewise, many process plants, and especially those using smart field devices, include applications used to monitor and maintain the devices within the plant regardless of whether these devices are process control and instrumentation devices or other types of devices. For example, the Asset Management Solutions (AMS™) Suite Intelligent Device Manager or more generally the AMS™ Suite of applications available from Emerson Process Management enable communication with and store data pertaining to field devices to ascertain and track the operating state of the field devices. An example of such a system is disclosed in U.S. Pat. No. 5,960,214 entitled "Integrated Communication Network for use in a Field Device Management System." In some instances, the AMS™ Suite of applications may be used to communicate with devices to change parameters within the device, to cause the device to run applications on itself, such as self-calibration routines or self-diagnostic routines, to obtain information about the status or health of the device, etc. This information may be stored and used by a maintenance person to monitor and maintain these devices. Likewise, there are other types of applications which are used to monitor other types of devices, such as rotating equipment and power generation and supply devices. These other applications are typically available to the maintenance persons and are used to monitor and maintain the devices within a process plant.

However, in the typical plant or process, the functions associated with the process control activities, the device and equipment maintenance and monitoring activities, and the business activities are separated, both (i) in the location in which these activities take place and, (ii) in the personnel who typically perform these activities. Furthermore, the different people involved in these different functions generally use different tools, such as different applications run on different computers to perform the different functions. In many instances, these different tools collect or use different types of data associated with or collected from the different devices within the process and are set up differently to collect the data they need. Example roles in the process control environment include (i) process control operators, (ii) maintenance personnel, and (iii) configuration or control engineers.

Regarding process control operators, these personnel generally oversee the day to day operation of the process and who are primarily responsible for assuring the quality and continuity of the process operation. A control operator typically affects the process by setting and changing set points within the process, tuning loops of the process, scheduling process operations such as batch operations, etc. These process control operators may use available tools for diagnosing and correcting process control problems within a process control system, including, for example, auto-tuners, loop analyzers, neural network systems, etc. Process control operators also receive process variable information from the process via one or more process controllers which provide information to the operators about the operation of the process, including alerts generated within the process. This information may be provided to the process control operator via a standard user interface.

Regarding maintenance personnel, these personnel are primarily responsible for assuring that the actual equipment within the process is operating efficiently and for repairing and replacing malfunctioning equipment. Maintenance personnel use tools such as maintenance interfaces, the AMS™ Suite of applications discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, applications in the AMS™ Suite of applications report device status and diagnostic information to the maintenance person and provide communication and other tools that enable the maintenance person to determine what is happening in devices and to access device information provided by devices. Typically, maintenance interfaces and maintenance personnel are located apart from process control operators, although this is not always the case. For example, in some process plants, process control operators may perform the duties of maintenance persons or vice versa, or the different people responsible for these functions may use the same interface.

Regarding configuration engineers, these personnel generally define the control strategies and control routines implemented by the controllers in the plant environment. During normal operation of the plant, one or more controllers implement the designed control routines in an automated or semi-automated fashion. During normal operation, the process control operators monitor performance of various aspects of the plant while the control strategies defined by the configuration engineers are implemented. If necessary, the operators can implement corrective control (or shutdown operation entirely, if necessary) when performance begins to degrade. In any event, example responsibilities for configuration engineers include: (i) utilizing a engineering tool or configuration application to design controller configurations including control routines, (ii) assigning the controller configurations to controllers, and (iii) uploading the controller configurations to a configuration database, where the controller configurations are eventually propagated to the appropriate controllers.

In order to test or verify draft controller configurations, the draft configuration generally needs to be saved into the configuration database of the control system and downloaded into other systems. Generally, testing or verifying any aspect of the control logic included in the controller configuration is not possible without saving a draft configuration and, e.g., uploading the controller configuration to the configuration database and propagating the controller configuration to the appropriate controller. Furthermore, generally speaking, testing and verification of the control logic typically cannot be performed within the configuration application or engineering tool environment itself (particularly not while utilizing, in whole or in part, actual process data collected by field devices associated with the designed control routine). As such, it is expensive (in both money and time) to verify control logic because for each incremental modification to a draft controller configuration, another complete cycle of saving, downloading, instantiating, and testing must be performed. Further, testing and verifying control logic requires the engineering tool and configuration database to be connected to another system.

SUMMARY

The described techniques enable plant personnel to avoid the time and labor-intensive process associated with traditional design systems by enabling users to design, test, and "preview" control logic for controlling a process before downloading the control logic to a configuration database or process controller in the plant. This enables the quick testing and improvement of control logic during the design phase, avoiding the time-consuming iterative process of designing, downloading to a database, propagating to a live controller, and testing on the physical controller. It also separates testing of logic and non-logic aspects of a controller configuration, enabling a user to finish designing the control logic before downloading the configuration to the controller, where she only needs to test non-logic aspects of the configuration.

Note, this summary has been provided to introduce a selection of concepts further described below in the detailed description. As explained in the detailed description, certain embodiments may include features and advantages not described in this summary (and certain embodiments) may omit one or more features or advantages described in this summary.

BRIEF DESCRIPTION OF THE DRAWINGS

Each of the figures described below depicts one or more aspects of the disclosed system(s) or method(s), according to an embodiment. The detailed description refers to reference numerals included in the following figures.

DETAILED DESCRIPTION

Figure 1:
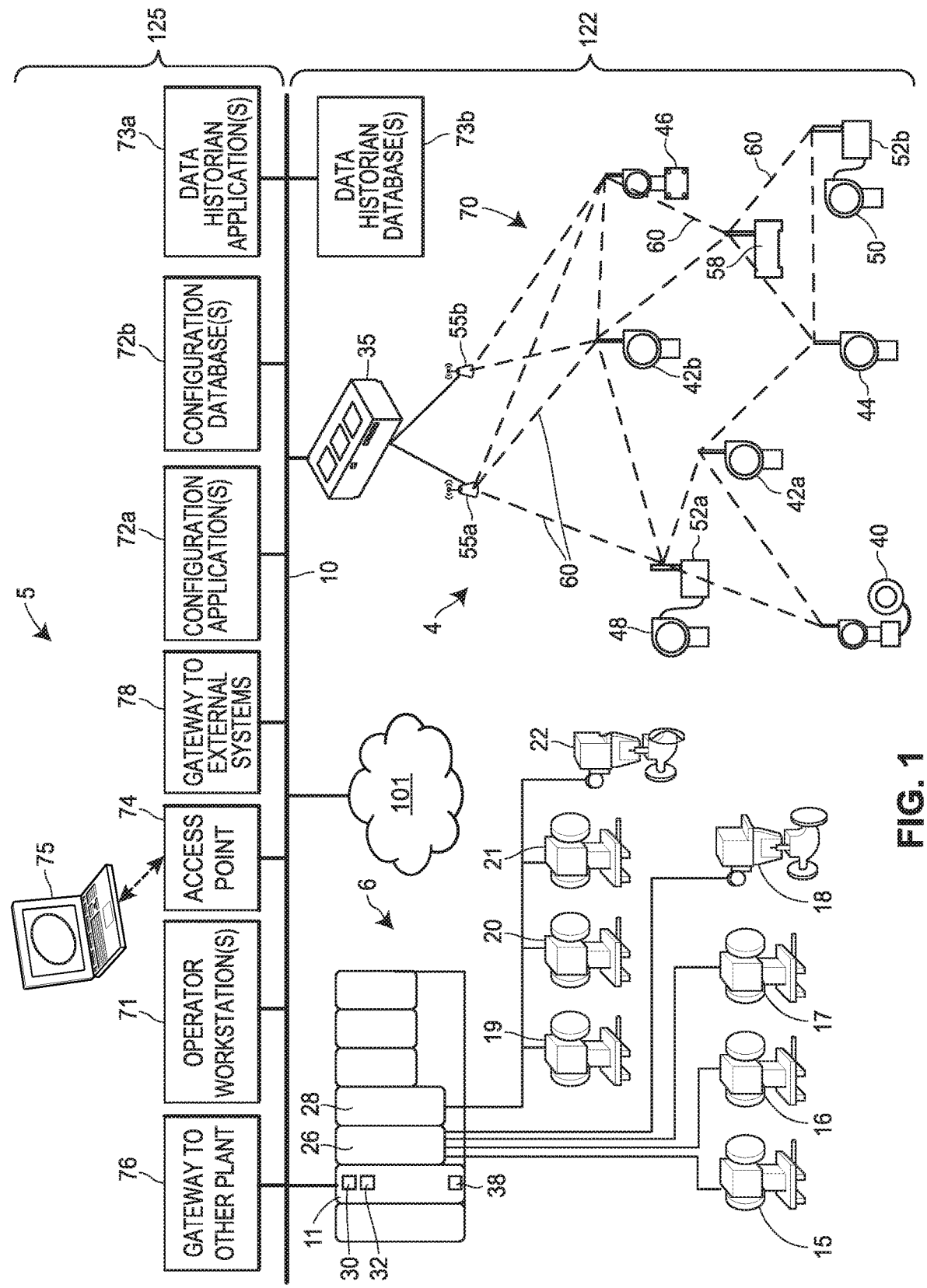
FIG. 1 shows an example process plant, process control system, or process control environment including a configuration tool that enables a user to design, test, and "preview" control logic for controlling a process before downloading the control logic (e.g., embodied by one or more control routines, modules, or programs) to a configuration database or process controller in the plant.

In the past, a configuration engineer would use an application such as Control Studio™, sold by Emerson Process Management, to design a controller configuration including control logic for controlling a process. To test the designed control logic, the user would download the controller configuration to a control system's configuration database. The controller configuration would then be propagated from the database to the appropriate live process controller. The engineer would then put the controller in safe made (e.g. inputs simulated, outputs stubbed off or put into manual mode; debug mode; etc.) and various inputs would be provided to the controller and corresponding controller outputs would be evaluated, enabling the engineer to monitor the performance of the draft control logic. When the control logic had less than ideal performance, the engineer would go back to the design tool, modify the controller configuration, download the configuration to the database, cause the database to propagate the configuration to the controller, configure the controller for testing, and again evaluate the performance of the control logic. In conjunction with testing the logic of the controller configuration throughout this incremental process, the engineer may also test and evaluate non-logic aspects of the configuration. For example, the engineer may test real-time behavior such as: resource usage (e.g. how much CPU and memory the logic consumes); the length of time it takes for blocks or modules of the controller configuration to execute; whether or not the blocks or modules run on time; communication delays (or lack thereof) for communications between the blocks or modules (e.g., particularly between blocks or modules at different controllers); the timing of the full signal cycle including a length of time for a first signal to be transmitted from an input device (e.g., carrying a measurement) and to reach a control routine at the controller (e.g., executing the logic of the controller configuration); a length of time to execute the logic or control routine after the first signal is received and to generate a second signal (e.g., carrying a control command); and a length of time between sending the second signal from the control routine and receiving the second signal at an output device; etc. The engineer would repeat this cycle as incremental changes were needed to perfect the control logic.

Here, plant personnel can avoid the time and labor-intensive process associated with traditional design systems by utilizing the configuration system described herein to design, test, and "preview" control logic for controlling a process before downloading the control logic to a configuration database or process controller in the plant. This enables the quick testing and improvement of control logic during the design phase, avoiding the time-consuming iterative process of designing, downloading to a database, propagating to a live controller, and testing on the physical controller. It also separates testing of logic and non-logic aspects of a controller configuration, enabling a user to finish designing the control logic before downloading the configuration to the controller, where she only needs to test non-logic aspects of the configuration.

An Example Process Control Environment

FIG. 1 shows an example process plant, process control system, or process control environment 5 including a configuration tool 101 that enables a user to design, test, and "preview" control logic for controlling a process before downloading the control logic (e.g., embodied by one or more control routines, modules, or programs) to a configuration database or process controller in the plant.

The process plant 5 controls a process that may be said to have one or more "process outputs" characterizing the state of the process (e.g., tank levels, flow rates, material temperatures, etc.) and one or more "process inputs" (e.g., the state of various environmental conditions and actuators, the manipulation of which may cause process outputs to change). The process plant or control system 5 of FIG. 1 includes a field environment 122 (e.g., "the process plant floor 122") and a back-end environment 125, each of which is communicatively connected by a process control backbone or data highway 10. The backbone 10 (sometimes referred to as the "link 10" or "network 10") may include one or more wired or wireless communication links, and may be implemented using any desired or suitable communication protocol, such as an Ethernet protocol.

At a high level (and as shown in FIG. 1), the field environment 122 includes physical components (e.g., process control devices, networks, network elements, etc.) that are disposed, installed, and interconnected to operate to control the process during run-time. For example, the field environment 122 includes an I/O network 6. By and large, the components of the I/O network 6 are located, disposed, or otherwise included in the field environment 122 of the process plant 5. Generally speaking, in the field environment 122 of the process plant 5, raw materials are received and processed using the physical components disposed therein to generate one or more products.

By contrast, the back-end environment 125 of the process plant 5 includes various components such as computing devices, operator workstations, databases or databanks, etc. that are shielded or protected from the harsh conditions and materials of the field environment 122. In some configurations, various computing devices, databases, and other components and equipment included in the back-end environment 125 of the process plant 5 may be physically located at different physical locations, some of which may be local to the process plant 5, and some of which may be remote.

The Field Environment 122 of the Plant 5

As noted, the field environment 122 includes one or more I/O networks such as the I/O network 6, each of which includes: (i) one or more controllers, (ii) one or more field devices communicatively connected to the one or more controllers, and (iii) one or more intermediary nodes (e.g., I/O cards or modules) facilitating communication between the controllers and the field devices.

Generally, at least one field device performs a physical function (e.g., opening or closing a valve, increasing or decreasing a temperature, taking a measurement, sensing a condition, etc.) to control the operation of a process implemented in the process plant 5. The field devices may be thought of as a means to manipulate a process input (e.g., a valve position or pump status) or to measure a process output (e.g., a tank level, a flow speed, a pressure, a temperature, a temperature, etc.). Some types of field devices communicate with controllers via I/O devices (sometimes called "I/O cards"). Process controllers, field devices, and I/O cards may be configured for wired or wireless communication. Any number and combination of wired and wireless process controllers, field devices, and I/O devices may be included in the process plant environment or system 5.

For example, the field environment 122 includes the I/O network 6, which includes a process controller 11 communicatively connected, via an I/O card 26 and an I/O card 28, to a set of wired field devices 15-22. The field environment 122 also includes a wireless network 70 including a set of wireless field devices 40-46 coupled to the controller 11 (e.g., via a wireless gateway 35 and the network 10). The wireless network 70 may be a part of the I/O network 6, or may be a part of an I/O network not shown in FIG. 1 (and may include controllers or I/O cards not shown in FIG. 1).

In some configurations, the controller 11 may be communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The Process Controller 11

The controller 11, which may be the DeltaV™ controller sold by Emerson Process Management, may operate to implement a batch process or a continuous process using at least some of the field devices 15-22 and 40-46. In addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 includes a processor 30 that implements or oversees one or more process control routines 38 (e.g., that are stored in a memory 32). A "control routine" (sometimes referred to as a "control module") is a set of instructions, executable by a processor (e.g., of the controller 11), for performing one or more operations to provide or perform on-line control of at least part of a process. Generally speaking, a control routine may be understood as software configured to implement a particular control strategy. Control routines may be saved to memory, e.g., as one or more routines, applications, software modules, or programs. Control routines may reference equipment objects to communicate with field devices corresponding to the equipment objects. A control routine may be made up of function blocks, wherein each function block is a part or a subroutine of an overall control routine. Each control routine may operate in conjunction with other control routines and function blocks to implement control routines or process control loops within the process plant. While the Fieldbus protocol and the DeltaV system protocol use control routines and function blocks designed and implemented in an object oriented programming protocol, control modules could be designed using any desired control programming scheme including, for example, sequential function block, ladder logic, etc., and are not limited to being designed and implemented using the function block or any other particular programming technique (unless otherwise stated).

Returning to the controller 11, the processor 30 is configured to communicate with the field devices 15-22 and 40-46 and with other nodes communicatively connected to the controller 11. Note, any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object-oriented programming, ladder logic, sequential function charts, function block diagrams, or using any other software programming language or design paradigm. The control routines 38 may be stored in any desired type of memory 32, such as random-access memory (RAM), or read only memory (ROM). Likewise, the control routines 38 may be hard-coded into, for example, one or more EPROMs, EEPROMs, application specific integrated circuits (ASICs), or any other hardware or firmware elements. Put simply, the controller 11 may be configured to implement a control strategy or control routine in any desired manner.

Note, the process controlled by the controller 11 (and any other controllers) may be characterized by "process variables." Process inputs, process outputs, controlled variables, manipulated variables, disturbance variables, and setpoints are all example process variables. The "process outputs" may be thought of as process variables representing the existing state of the process, and the "process inputs" may be thought of as process variables representing various conditions, settings, equipment, signals, and other information that may impact execution of the process. The controller 11 may receive as "control inputs" measurements of one or more of the process outputs and may transmit one or more "control outputs" as control signals (which may be thought of as process inputs) configured to manipulate the state of a device to drive a process output to a desired state.

Example "process outputs" might include tank levels, flow rates, material temperatures, piping and tank pressures, the current states of various valves, pumps, and other equipment, etc. Process outputs are often measured and monitored to evaluate performance of the process and to inform how process inputs should be manipulated to manipulate the process outputs to desirable states.

Example "process inputs" might include the state of raw material being processed, environmental conditions, the state of equipment in the plant such as actuators (the manipulation of which may cause process outputs to change), the settings for the equipment (such as the operational settings of valves), etc. The state of any one or more of the process inputs might affect how the process executes. Note, process outputs and process inputs are not necessarily mutually exclusive. For example, a valve CV001 may have a position of 50% open, which may be understood as a current condition of the process and thus a process output. However, the valve position may affect other process outputs (such as flow rate) and may be measured (e.g., to verify that it reaches a desired position after having been commanded to move to the desired position). Thus, the valve position also may be understood as a process input.

As noted, example process variables include controlled variables, manipulated variables, disturbance variables, and setpoints. A "controlled variable" is a process variable (e.g., a tank level) that a controller or control routine is attempting to indirectly control by adjusting a "manipulated variable" (e.g., a water inlet valve for the tank). A control routine may adjust the manipulated variable to drive the controlled variable to a desired setpoint. A "setpoint" represents a desired value for a controlled variable. The setpoint may be automatically set by a controller based on a control routine, or may be manually set by an operator.

Returning to the controller 11, when the processor 30 of the controller executes one or more of the control routines, the controller transmits to a field device a control signal (i.e., a control output) carrying a command or value generated based on: (i) one or more received control inputs (e.g., one or more received signals representing measurements of process outputs obtained by field devices), and (ii) the logic of the one or more control routines being implemented using values of the control inputs as inputs. The control routines may be defined by one or more software elements (e.g., function blocks). Specifically, the controller 11 may implement a control strategy using function blocks, where each function block is an object or other part (e.g., a subroutine) of an overall control routine. The controller 11 may operate in conjunction with function blocks implemented by other devices (e.g., other controllers or field devices) to implement process control loops within the process control system 5.

Note, the term "control loop" generally refers to a subsystem of the process control system utilized to implement control of a particular aspect of the process. A control loop includes the physical components and logical components needed to control a controlled variable (often simply referred to as a process variable or PV). For example, the physical components may include (i) a sensor for measuring the PV (e.g., included in a first field device that measures a tank level), (ii) a final control element (or FCE) that can be adjusted to manipulate the process variable (e.g., a second field device that is a valve), and (iii) a controller configured to adjust the FCE (e.g., the controller 11). The logical components may include the control routine(s) at the controller that drive a control signal to cause an actuator (e.g., a valve actuator) to adjust the FCE (e.g., a valve) based on measurements received at the controller. In the given example, the valve position may be considered the manipulated variable (MV), which may be adjusted to drive the PV to a setpoint. Control loops may be utilized in a variety of scenarios. As one example, a process control system may include a control loop for controlling a water level in a tank. A process control system may include hundreds or thousands of control loops for controlling a plethora of process variables.

Returning to the function blocks that may be implemented at the controller 11, control based function blocks typically perform one of: (i) an input function, such as that associated with a transmitter, a sensor or other process parameter measurement device (sometimes referred to as "input blocks"); (ii) a control function, such as that associated with a control routine that performs PID, fuzzy logic, etc. (sometimes referred to as "control blocks"); or (iii) an output function which controls the operation of some device, such as a valve, to perform some physical function within the process control system 5 (sometimes referred to as "output blocks"). Of course, hybrid and other types of function blocks exist.

Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. One or more of the control routines 38 may implement one or more control loops which are performed by executing one or more of the function blocks.

The Wired Field Device 15-22 and I/O Cards 26 and 28

The wired field devices 15-22 may be any types of devices, such as sensors, valves, transmitters, positioners, etc., while the I/O cards 26 and 28 may be any types of process control I/O devices conforming to any desired communication or controller protocol. In FIG. 1, the field devices 15-18 are standard 4-20 mA devices or HART® devices that communicate over analog lines or combined analog and digital lines to the I/O card 26, while the field devices 19-22 are smart devices, such as FOUNDATION® Fieldbus field devices, that communicate over a digital bus to the I/O card 28 using a FOUNDATION® Fieldbus communications protocol. Additionally or alternatively, in some embodiments at least some of the wired field devices 15-22 or at least some of the I/O cards 26, 28 communicate with the controller 11 using the process control data highway 10 or by using other suitable control system protocols (e.g., Profibus, DeviceNet, Foundation Fieldbus, ControlNet, Modbus, HART, etc.).

The Wireless Field Devices 40-46

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, or other nodes or devices of the process control plant 5. For example, the wireless gateway 35 may provide communicative coupling by using the process control data highway 10 or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, or via the process control data highway 10.

The Back-End Environment 125 of the Plant 5

As noted, the back-end environment 125 includes various components such as computing devices, operator workstations, databases or databanks, etc. that are typically shielded or protected from the harsh conditions and materials of the field environment 122. The back-end environment 125 may include any one or more of the following, each of which may be communicatively connected to the data highway 10: (i) one or more operator workstation(s) 71; (ii) a configuration application 72a and a configuration database 72b; (iii) a data historian application 73a and a data historian database 73b; (iv) one or more other wireless access points 74 that communicate with other devices using other wireless protocols; and (v) one or more gateways 76, 78 to systems external to the immediate process control system 5.

The Operator Workstation 71

Users (e.g., operators) may utilize the operator workstation 71 to view and monitor, via GUIs, run-time operations of the process plant 5, as well as take any diagnostic, corrective, maintenance, or other actions that may be required. The tool 101 may be utilized to design the GUIs provided by the workstation 71.

At least some of the operator workstations 71 may be located at various, protected areas in or near the plant 5, and in some situations, at least some of the operator workstations 71 may be remotely located, but nonetheless in communicative connection with the plant 5.

Operator workstations 71 may be wired or wireless computing devices, and may be dedicated or multi-purpose devices. For example, in some embodiments, a set of applications, routines, or specially configured circuits (e.g., ASICs) that enable the functionality provided by the workstations 71 may be implemented by any suitably configured computing device or set of computing devices capable of accessing the network 10 (e.g., a desktop computer, a laptop, a mobile device such as a phone or tablet, a client/server(s) system, etc.), and may include a user interface with input components (e.g., a mouse, keyboard, touch sensors, hardware buttons, audio sensors for voice input, cameras or motion sensors for gesture input, etc.) and output components (e.g., a display, speakers, etc.) enabling the user of the workstation 71 to monitor run-time parameters, change run-time parameters, or perform or monitor diagnostic, corrective, or maintenance operations.

The Data Historian 73a and Database 73b

The data historian application 73a collects some or all of the data provided across the data highway 10, and historizes or stores the collected data in the historian database 73b for long term storage. The data historian application 73a and historian database 73b may be centralized and may have a unitary logical appearance to the process control system 5 (e.g., they may appear to be a single application or application suite), although multiple instances of a data historian application 73a may execute simultaneously within the process control system 5, and the data historian 73b may be implemented across multiple physical data storage devices. Each instance of the data historian application 73a may be implemented on any suitable computing device or set of computing devices (e.g., a desktop computer or workstation, a laptop, a mobile device such as a phone or tablet, a client/server(s) system, etc.), which may include a user interface with input components (e.g., a mouse, keyboard, touch sensors, hardware buttons, audio sensors for voice input, cameras or motion sensors for gesture input, etc.) and output components (e.g., a display, speakers, etc.).

The Wireless Access Points 74

The one or more other wireless access points 74 enable devices in the back-end environment 125 (and sometimes in the field environment 122) to communicate with other devices using wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radio communication Sector) compatible protocols, short-wavelength radio communications such as near field communications (NFC) and Bluetooth, or other wireless communication protocols.

Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, or wireless devices 35, 40-58) also communicate using the wireless protocol supported by the access points 74.

The Gateways 76 and 78

The gateways 76 and 78 may interface with systems external to the immediate process control system 5. Typically, such systems are customers or suppliers of information generated or operated on by the process control system 5. For example, the process control plant 5 may include a gateway node 76 to communicatively connect the immediate process plant 5 with another process plant. Additionally or alternatively, the process control plant 5 may include a gateway node 78 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

The Configuration Applications 72a and Database 72b

Remaining with FIG. 1, the configuration application 72a and the configuration database 72b (collectively the "configuration system 72") may be utilized to configure certain aspects of the plant 5. Various instances of the configuration application 72a may execute on one or more computing devices (not shown) to enable users to create or change process control modules and download these modules via the data highway 10 to the controllers 11, as well as to enable users to create or change operator interfaces via which an operator is able to view data and change data settings within process control routines (e.g., the interfaces provided by the workstation(s) 71).

Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5 (also referred to interchangeably here as "run-time" operations of the process plant 5).

Each instance of the configuration application 72a may be implemented on any suitable computing device or set of computing devices (e.g., a desktop computer or workstation, a laptop, a mobile device such as a phone or tablet, a client/server(s) system, etc.), which may include a user interface with input components (e.g., a mouse, keyboard, touch sensors, hardware buttons, audio sensors for voice input, cameras or motion sensors for gesture input, etc.) and output components (e.g., a display, speakers, etc.).

In operation, the configuration database 72b stores the controller configurations utilized by controllers in the plant 5, process modules representing various areas or units of the plant 5, or user interfaces created (e.g., configured) by the users.

Generally speaking, the phrase "process module" refers to a set of data, instructions, or some combination thereof representing a set of process control elements or components (e.g., equipment such as field devices, tanks, pipes, etc.) included in a particular area or unit of the plant. For example, a plant may include a "City Water" unit that takes in municipal water, stores it in a tank, and disperses it to other areas of the plant as need while maintaining a desirable tank level. The process module for the "City Water" unit may include data identifying equipment in the unit (e.g., a tank, intake and outtake pumps and valves, a level indicator for the tank, etc.); data indicating how each of the components is connected (e.g., indicating that a valve "CV013" is an intake valve upstream from the tank between the tank and water supply, indicating that it can be opened or closed to manipulate the flow of water into the tank); control routines for controlling various aspects of the unit (e.g., for opening the water supply to fill the tank when the level reaches a particular minimum level); etc. In some instances, the process module includes or references equipment objects, wherein each equipment object represents an actual equipment component in the plant. Some may find it helpful to think of a process module as a blueprint for a unit of the plant. The described systems may include a process module GUI that facilitates designing these blueprints (i.e., the process modules) and the configuration of the corresponding physical equipment in the unit represented by the blueprints (i.e., process modules).

Returning to the configuration system 72, like the data historian application(s) 73a and database(s) 73b, the configuration application 72a and configuration database 72b may be centralized and may have a unitary logical appearance to the process control system 5, although multiple instances of the configuration application 72a may execute simultaneously within the process control system 5. Further, the configuration database 72b may be implemented across multiple physical data storage devices. Accordingly, the configuration application 72a, the configuration database 72b, and the user interfaces thereto (not shown) comprise a configuration or development system 72 for control or display modules.

In further operation, the configuration system 72 enables the creation, assignment, and storage of logical identifiers of components in the field environment 122. The logical identifiers may be referenced by the control modules and devices implemented in the plant 5 to interact with the components (and associated signals) assigned to the logical identifiers.

For example, one or more devices in the plant may each have an assigned "device tag" or "DT." A device tag (sometimes called a "field device tag") is a logical entity that identifies a particular field device. Generally speaking, device tags are used to logically associate or assign an input or output block of a control module to a particular field device. Once a device tag is associated with a particular I/O port or I/O channel, the field device becomes bound to the block. Such process control system I/O binding may occur automatically based upon the sensing of I/O or field devices. Additionally, or alternatively, such binding may occur during configuration (e.g., by a user) of the process control module.

Further, one or more signals transmitted or received by devices in the plant may each have an assigned "signal tag," which is sometimes called a "device signal tag" or "DST." In some instances, DSTs only need be implemented for devices that transmit or receive more than a single signal. Collectively, the DTs and DSTs may simply be referred to as "tags," "system tags," or "system identifiers." In many instances, the logical identifiers have an associated value or set of values, each of which represents a particular variable value (e.g., measurement) or command. Generally speaking, the tags may be used by the process plant 5 in both the field environment 122 and in the back-end environment 125 to uniquely identify an associated device or signal. Consequently, control routines can reference the tags and associated values to implement control of the plant.

To illustrate, for a given field device, the configuration database 72b may store information mapping or binding a logical identifier or tag to a particular hardware address or I/O channel. The hardware address may identify a particular controller, a particular I/O card connected to the particular controller, or a particular address for the I/O channel connecting the particular I/O card to the field device. In some instances, this mapping or binding may be stored at the controller 11, the user interface device 75, the operator workstation 71, or any other desired device (e.g., any device needing to resolve the logical identifier). After a tag has been bound to a hardware address or I/O channel, the tag is considered "assigned."

Additional Examples of the Plant 5

Although FIG. 1 only illustrates a single controller 11 with a finite number of (i) field devices 15-22 and 40-46, (ii) wireless gateways 35, (iii) wireless adaptors 52, (iv) access points 55, (v) routers 58, and (vi) wireless process control communications networks 70, FIG. 1 is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

The Configuration Tool 101

Figure 2A:
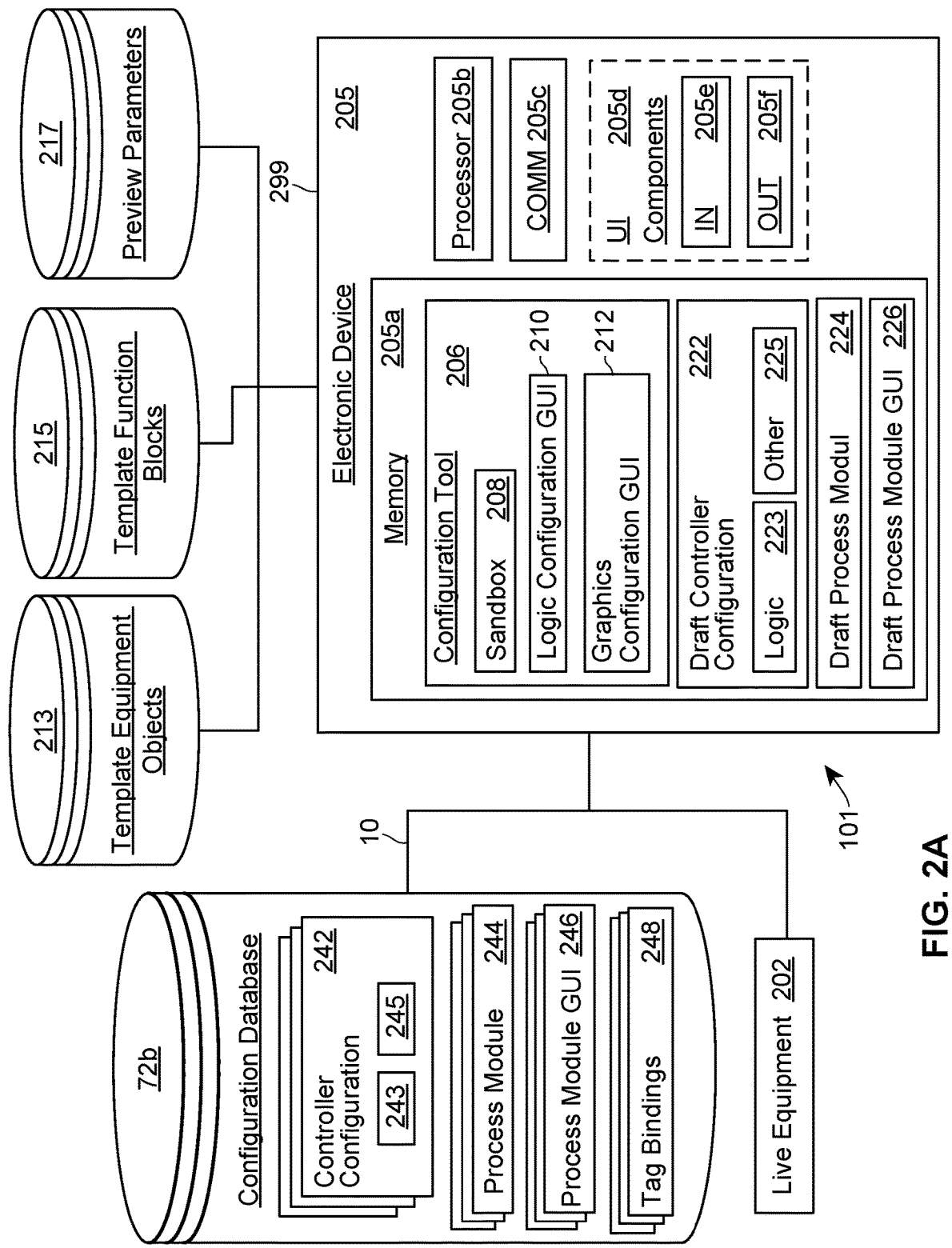
FIG. 2A shows a block diagram of the configuration tool shown in FIG. 1, including a draft controller configuration that may be designed and tested using the configuration tool.

FIG. 2A shows a block diagram of the configuration tool 101 shown in FIG. 1, including a draft controller configuration 222 that may be designed and tested using the configuration tool 101. Advantageously, a set of logic 223 of the draft controller configuration 222 may be tested and iteratively improved within the tool 101 before being finalized and downloaded to the configuration database 72b and live equipment 202 (e.g., the controller 11 or any other suitable operational device in the plant 5).

Components of the Configuration Tool 101

The configuration tool 101 includes an electronic device 205 and one or more databases storing: (i) templates 213 for equipment objects representing various types of equipment in a plant (e.g., pumps, valves, tanks, flow/level/pressure/temperature indicators, etc.), each of which has a graphic that may be dragged and dropped onto a canvas area of a graphics configuration GUI 212 and configured to represent a particular piece of equipment (e.g., virtual or physical) and linked to other graphics 213 to create (a) a process module 224 representing an area in the plant or (b) a process module GUI 226 (representing the process module 224) that can be utilized by an operator during run-time to monitor operation of the area of a plant; (ii) templates 215 for function blocks that may be dragged and dropped into a canvas area of a logic configuration GUI 210 to create logic 223 of a controller configuration 222 to be implemented by one or more controllers; and (iii) one or more preview parameters 217 for configuring the manner in which the configuration 222 is tested. The configuration tool 101 may be communicatively coupled to the configuration database 72b, which may store: one or more controller configurations 242; one or more process modules 244; one or more process module GUIs 246; and one or more tag bindings 248.

The electronic device 205 is an electronic computing device including a memory 205a, a processor 205b, and a communication interface 205c, each of which may be communicatively connected to a system bus (not shown) of the device 205. The communication interface 205c may include a plurality of interfaces, such (i) as one or more network interface cards or "NICs" (e.g., a wireless card or a wired card) for coupling the device 205 to external nodes or devices, and (ii) one or more input/output ("I/O") interfaces for coupling the device 205 to one or more devices or modules configured to relay user input to the device 205 or to provide output for the device 205 in a form consumable by one or more users. For example, the I/O interface 205c of the device 205 may be communicatively coupled to one or more UI components 205d, including one or more input components 205e and one or more output components 205f. An example output component 205f is a display, which may be any suitable component or device configured to display information in pictorial or visual form (e.g., utilizing LED, LCD, or CRT technology), and may include a screen (which may be touch sensitive in some instances), projector, or any other output device capable of providing visual output. The input component 205e may be any suitable component or sensor that can be actuated or interacted with to provide input to the device 205, and may include a hardware actuator that mechanically actuates to provide input (e.g., a key, a button, etc.) or a sensor that actuates by way of detecting changes in an electromagnetic field (e.g., a capacitive or a resistive touch sensor, which may be integrated with the display 205f to form a touchscreen).

The memory 205a of the device 205 includes (i) a configuration routine 206 for designing and testing controller configurations, (ii) a draft controller configuration 222 that may be assigned to a controller and eventually uploaded to the controller, (iii) a draft process module 224 representing an area of the plant 5, and (iv) a draft process module GUI 226 configured to enable an operator to monitor and control the process module 224 represented by the GUI 226. First, the configuration routine 206 (sometimes referred to as the "tool 206" or the "module 206") is a set of instructions that, when executed, causes the device 205 to (i) display the logic configuration GUI 210 or the graphics configuration GUI 212 and (ii) utilize a sandbox 208 to test logic developed via one of the GUIs 210/212. Second, the draft controller configuration 222 is a controller configuration that may be designed, tested, and edited using the routine 206 and includes (i) the logic module 223 (which may be any suitable set of instructions; control routines; applications; etc.) and (ii) a non-logic module 225. Third, the draft process module 224 is a process module that may be designed using the routine 206. Fourth, the draft process module GUI 226 is a process module GUI that may be designed using the routine 206. Any one or more of the modules 208-212 may be modules or components of the routine 206, or may be relatively independent modules or components that can be called or initiated by the routine 206.

Generally speaking, the draft process module 224 is a set of data, instructions, or some combination thereof representing a particular area or unit of the plant 5, including the equipment (e.g., field devices, tanks, pipes, etc.) in that particular area or unit. Typically, the process module GUI 226 is a graphical operator interface depicting equipment included in the area or unit represented by the process module 224. Some may find it helpful to think of the process module 224 as a blueprint for an area of the plant and the process module GUI 226 as an interface for designing the blueprint (i.e., the module 224) and the corresponding physical unit.

The routine 206 is a set of machine-readable instructions (e.g., a software module, application, or routine) that, when executed by the processor 205b, causes the device 205 to provide a graphical user interface (GUI) for interacting with the tool 101. In some instances, the device 205 may interact with a server (not shown) to receive data or instructions utilized to provide the GUI. The routine 206 may be a dedicated application for the configuration tool 101 or may be an application not dedicated specifically for the configuration tool 101 (e.g., a web browser).

The sandbox 208 is a set of machine-readable instructions (e.g., a software module, application, or routine) that, when executed by the processor 205b, causes the device 205 to implement a testing environment for the logic 223 of the configuration 222. The sandbox 208 may include a software emulation of the controller for which the configuration 222 is being designed (e.g., the controller 11), as well software emulations of one or more field devices that may be coupled to the intended controller. Note, in an embodiment, anything executed within the sandbox 208 has no impact outside of the sandbox 208 (that is, execution will have no impact on operation of the plant 5).

Example Operation of the Tool 101

In operation, the tool 101 may: (i) provide the logic configuration GUI 210, enabling a user to design and modify the configuration 222, including the logic 223; (ii) test the logic 223 in the sandbox 208, upload the configuration 222 to the database 72 (where it is stored as the final configuration 242 and eventually propagated to the live equipment 202); and (iii) display the GUI 212, enabling a user to design the process module 224 and the corresponding GUI 226 for the process module 224. Note, the tool 101 may implement a "preview mode" in association with the GUI 210 or the GUI 222, enabling a user to (i) view and modify one or more of the preview parameters 217 for testing the logic 223 of the configuration 222; and (ii) test the logic 223 utilizing the sandbox 208.

The preview parameters 217 may include process variables received or transmitted by the draft controller configuration 22, logic parameters impacting implementation of the logic 223 (e.g., proportional terms, integral terms, or derivative terms), or any other suitable parameter.

Example preview parameters 217 may include an injection status parameter for one or more variables for a block. The injection status indicates whether the associated variable should utilize a value fed to it from live equipment or an upstream block or a value manually set by a user (e.g., to test the response of the block and logic 223. As an example, an analog input (AI) block for a temperature indicator may have an injection status indicator indicating whether or not the block should utilize a live temperature measured in the field or a test value for the temperature manually provided by the user. Similarly, various status or alarm parameters for the block may also be overridden with manual values (e.g., tuning parameters such as gain, reset, rate, etc.).

Figure 2B:
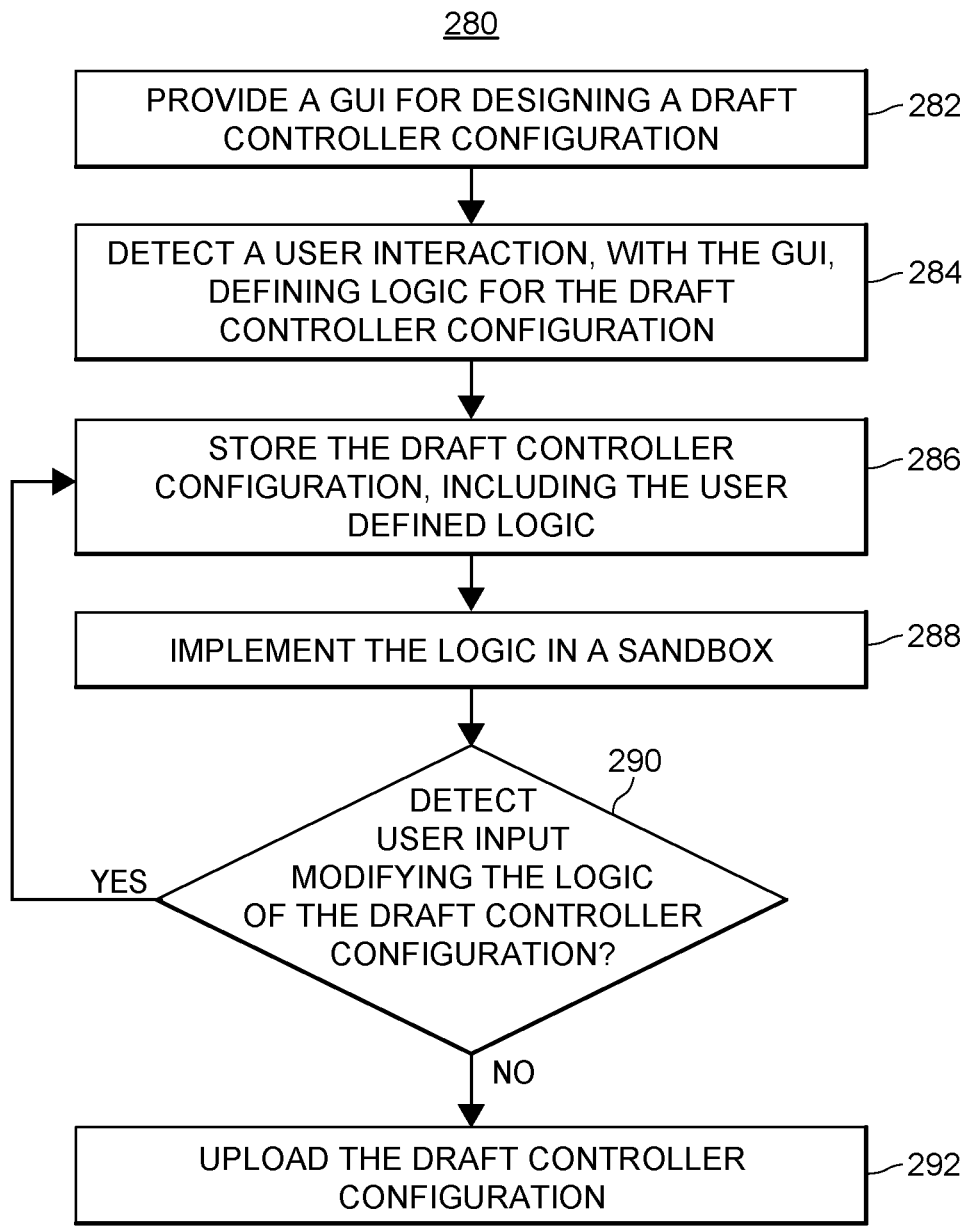
FIG. 2B illustrates an example method for implementing a preview mode to test the logic of the draft controller configuration shown in FIG. 2A.

FIG. 2B illustrates an example method 280 for implementing a preview mode to test the logic 223 of the configuration 222 shown in FIG. 2A. The method 280 may be implemented, in whole or in part, by the system configuration tool 101 (e.g., by the device 205). The method 280 may be saved to a memory as one or more instructions or routines.

The method 280 begins at a block 282 when the tool 101 provides a GUI (e.g., the GUI 210) for designing a draft controller configuration. The GUI may include one or more areas including (i) input block templates (e.g., AI or DI blocks configured to receive a value from a field device linked to the block and to forward the value to any other linked blocks); (ii) function block templates (e.g., PID blocks that implement various functions), and (iii) output block templates (e.g., AO or DO blocks configured to receive a value or command from a block and to cause the controller to transmit a signal carrying the value or command to a field device linked to the block). These template blocks may be dragged and dropped to a canvas area of the GUI, where they can be linked and configured to define the logic 223 of the controller configuration 222.

At a block 284, the tool 101 detects a user interaction (e.g., via the UI components 205d) defining the logic 223. As noted, this user interaction may be the user dragging and dropping block templates 215 to a canvas area, where they are linked and configured to define the logic 223.

At a block 286, the tool 101 stores the draft controller configuration 222 with the logic 223 to a memory.

At a block 288, the tool 101 implements the logic 223 in the sandbox 208. The block 288 may occur in response to the user interacting with a graphic element of the GUI 210 (e.g., a button to start testing). During testing, the user may override a value fed to a given block (e.g., by another block or by live equipment) of the logic 223 by "injecting" a value manually set by a user. The user may inject the value to analyze the response of the block and the logic 223 (e.g., by injecting an outlier value, by triggering an alarm, by setting a fault device status, etc.).

At a block 290, the tool 101 determines whether or not the user wants to continue modifying the logic 223 or to save the logic 223 as a final draft. Generally speaking, if a user wants to modify the logic 223 while testing, the method may return to the step 286. That is, the user may return to the canvas area of the GUI 210 to modify the logic 223 (e.g., by adding or removing blocks, or by adjusting one or more parameters defining behavior of the blocks, such as a proportional, integral, or derivative, value for a PID block). After testing the logic 223, the user may interact with a button or other GUI element to stop the testing and to go back to editing. If desired, the user may simultaneously edit the logic 223 while executing the logic 223 in the sandbox 208.

When the user is finished designing and testing the logic 223, the tool 101 may detect user input representing a command to finalize the draft controller configuration 222. For example, the device 205 may detect the user interacting with any suitable GUI element configured to receive such a command. The GUI element may be a button labeled "Finalize Configuration," "Save Configuration," "Upload Configuration to Configuration Database," "Upload Configuration to Assigned Controller," etc.

At a block 292, the tool 101 may transmit the draft configuration 222 to the database 72b where it is saved as the final controller configuration 252. The database 72b may then propagate the configuration 242 to the appropriate live equipment (e.g., to the controller 11).

Example Control Modules, Process Modules, and Process Module GUIs

Figure 3:
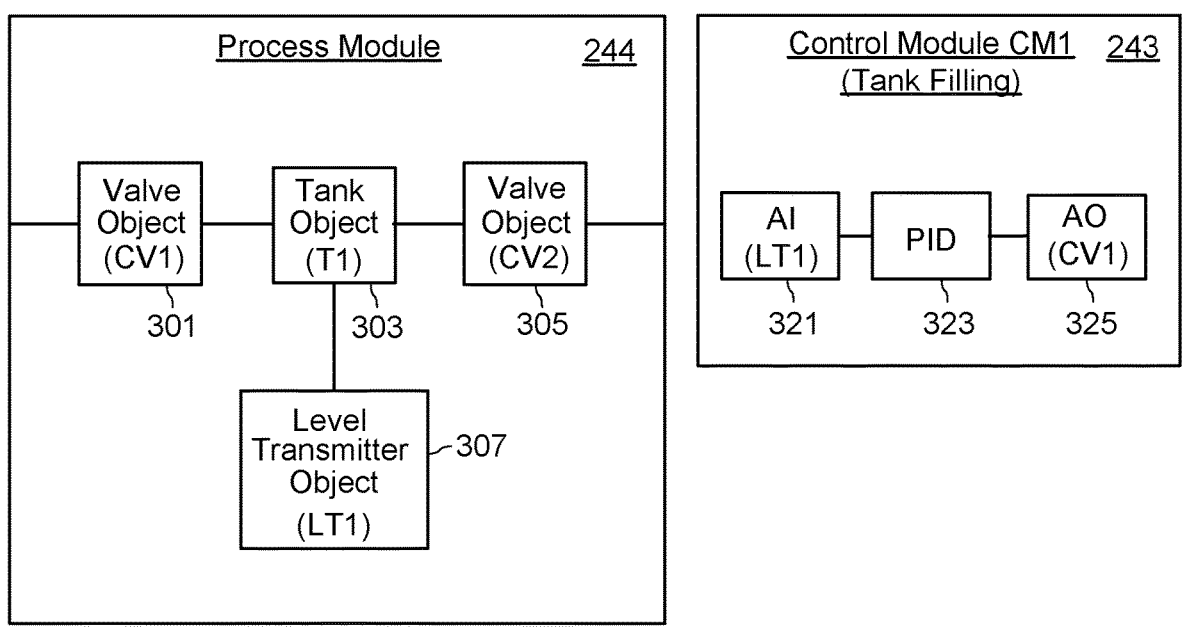
FIG. 3 shows examples of the process module and the control module shown in FIG. 2A.

FIG. 3 shows examples 300 of the process module 244 and the control module 243 shown in FIG. 2A. The control module 243 may be designed via the GUI 210 and tested in "preview mode" utilizing the sandbox 208 shown in FIG. 2A. Similarly, the process module 244 may be designed via the GUI 212.

The process module 244 includes a valve object 301 representing a control valve CV1; a tank object 303 representing a tank T1; a valve object 305 representing a valve CV2; and a level transmitter object 307 representing a level transmitter LT1. Each of the objects 301-307 may include parameters describing or corresponding to the equipment each represents (e.g., a unique tag identifying the appropriate equipment, such as "CV1;" status or diagnostic parameters for the represented equipment; description of the equipment (e.g., tank inlet valve); physical location (e.g., GPS coordinates); valve wetted parts (i.e., the part in contact with the process); materials (e.g., steel); etc.).

The control module/routine/logic 243 represents logic for controlling a tank filling procedure, and may be referred to as a control routine or application. The module 243 includes an AI block 321 bound to a level transmitter LT1; a PID block 323 including logic that operates on a value (representing a tank level) passed to the PID block 323 (e.g., a value of 0%-100%); and an AO block 323 bound to a control valve CV1.

In operation, the LT1 measures a level (e.g., in a tank) and transmits a signal to a controller implementing the module 243 (e.g., the controller 11) or an I/O card coupled to the controller. The AI block 321 generates a value representing a level based on the signal. For example, the controller may receive a 4-20 mA signal representing a range of 0% full to 100% full. Based on the signal (e.g., 12 mA), the AI block 321 generates a corresponding value (e.g., 50%), which is passed to the PID block 323. Based on logic implemented by the PID block 323, the PID block 323 may pass a command to the AO block 235 to adjust the position of the valve CV1 for the purpose of achieving a desired setpoint level (e.g., if tank level should be 65%, the valve may need to opened further). The AO block 325 receives this command and causes the controller implementing the AO block 325 to transmit a signal (e.g., 4-20 mA) to an actuator for the valve CV1 to cause the valve to adjust in a manner consistent with the command (e.g., to open the valve further).

Advantageously, a user may design the control module 243 utilizing the system 101, and may iteratively test the logic of the control module 243 until the control module 243 achieves desired results in responding to various conditions. The user can do this without uploading the control module 243 to the configuration database 72b, without propagating the module 243 to a live controller, and without testing the logic on a live controller.

Figure 4:
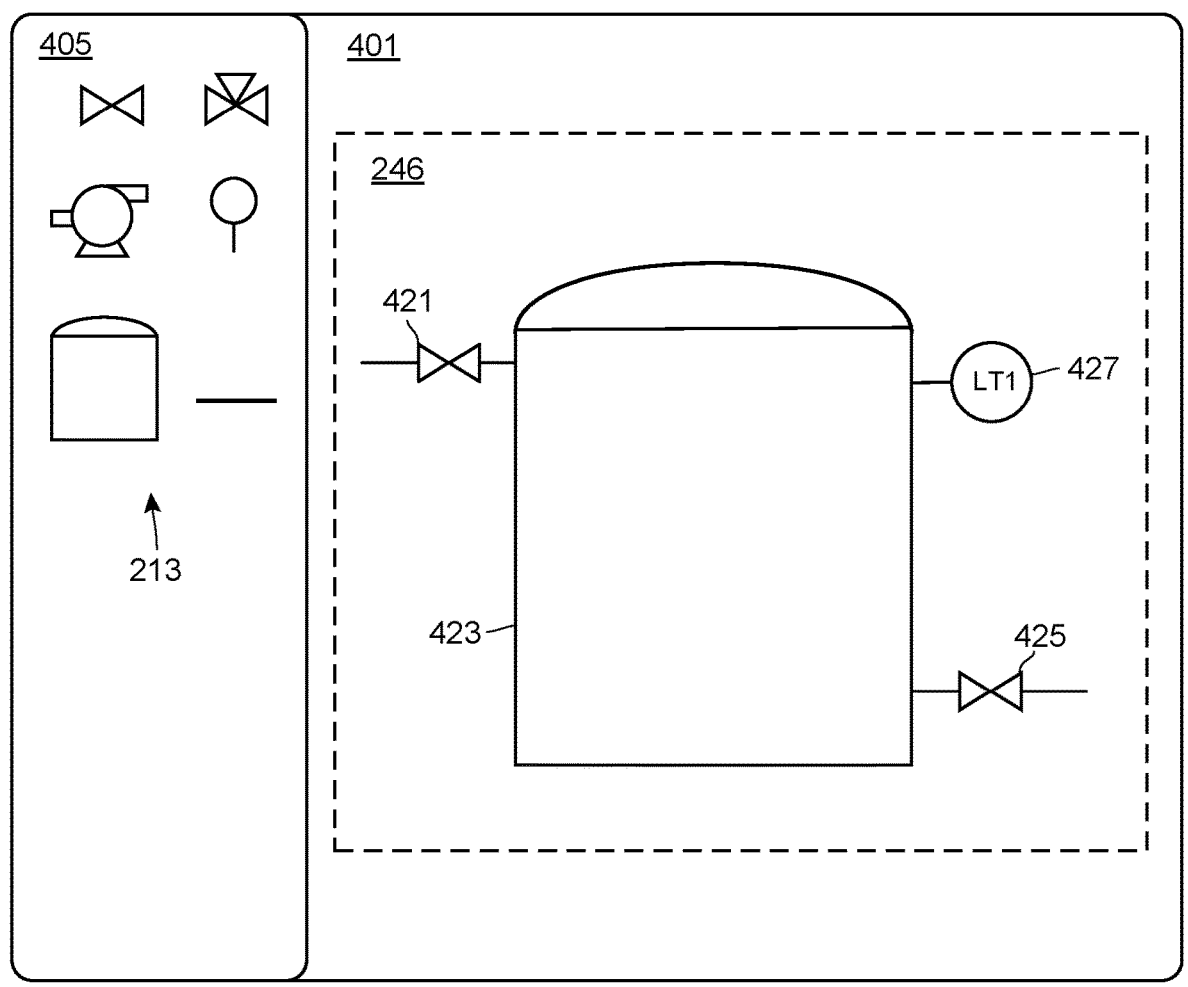
FIG. 4 shows an example of the graphics configuration that may be utilized to design the process module shown in FIG. 2A.

FIG. 4 shows an example of the graphics configuration GUI 212 that may be utilized to design the process module GUI 246 shown in FIG. 2A (which may function as an operator interface). Note, the GUI 246 shown in FIG. 4 is only an example—the GUI 246 may take a different form depending on the implementation and depending on the process control unit it represents.

The graphics configuration GUI 212 includes: (i) a library area 405 including one or more graphics representing the templates equipment objects 213 (e.g., valve templates, pump templates, tank templates, flow indicator templates, pipe templates, etc.) and (ii) a canvas area 401 in which a user may create a process module or process module GUI such as the GUI 246. The GUI 246 includes a plurality of graphics 421-427 representing equipment in the unit represented by the GUI 246.

In operation, a user may drag one or more of the graphics 213 into the canvas area 401, where she can bind the object to a particular tag (thus binding the object to the equipment corresponding to the tag). The user may also link the objects in the canvas area to define a process module (e.g., the module 244) and the GUI 246 representing the process module. As noted, the GUI 246 includes the graphics 421-427, which correspond to the objects 301-307 (and thus correspond to the equipment represented by the objects 301-307).

Figure 5:
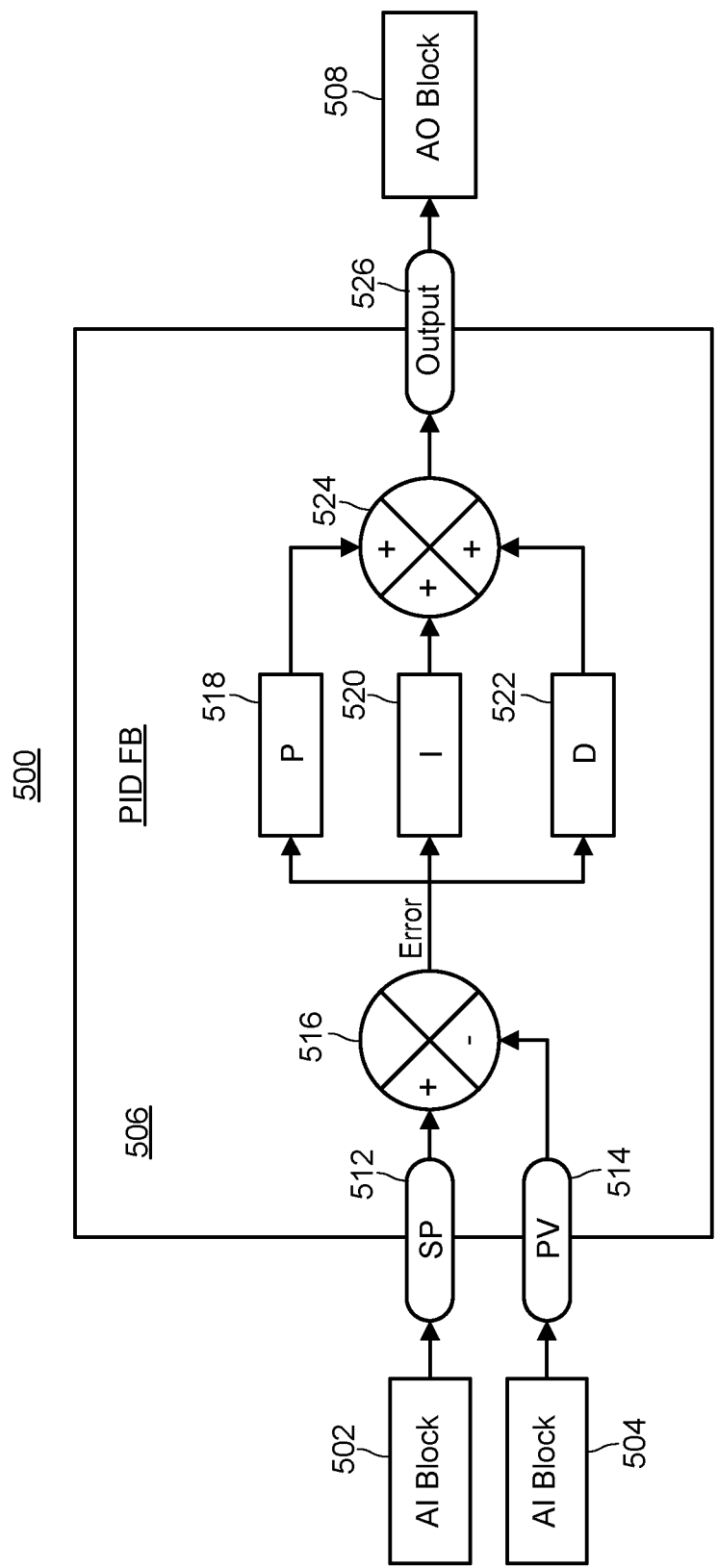
FIG. 5 shows an example control routine that may be designed and previewed using the configuration tool shown in FIG. 1.

FIG. 5 shows an example control routine 500 that may be designed and previewed using the configuration tool 101. The control routine 500 includes four blocks: an analog input (AI) block 502, an AI block 504, a control block 506, and an AO block 508. Depending on the implementation, the AI blocks 502 and 504 may represent analog signals received (e.g., from a field device) via an I/O channel by a controller implementing the routine 500 or an I/O card coupled to the controller. For example, the AI block 504 may be bound to a first device signal tag (DST) identifying a particular AI I/O channel at a first I/O card, and the value provided by the AI block 504 may consequently be driven by the value of the signal on the particular AI I/O channel (e.g., a 4-20 ma signal provided by a flow transmitter field device representing a measured flow). Similarly, the AO block 508 may represent an analog signal to be transmitted (e.g., to a field device) via an I/O channel by a controller implementing the routine 500 or to an I/O card coupled to the controller. To illustrate, the AO block 508 may be bound to a second DST identifying a particular AO I/O channel at a second IO card. Thus, the value fed to the AO block 508 may cause the second I/O card to drive a signal on the particular AO I/O channel based on the value received at the AO block 508 (e.g., the value may cause the second I/O card to drive a 4-20 ma signal via the AO I/O channel to a valve field device to control the valve's position).

Generally speaking, a designer creates the routine 500 by dragging and dropping graphics representing the template control blocks 215 from a library area of the GUI 210 onto a canvas area of the GUI 210 to create the blocks 502-508, connecting the blocks 502-508 as desired, and setting parameters to configure the blocks 502-508 so that tags or signals can be linked or bound to one or more of the blocks 502-508 if desired and so that a desired function can be configured for one or more of the blocks 502-508 if desired.

While the control routine 500 provides an analog output based on a set of analog inputs, it will be appreciated that control routines implemented by the controller 11 or other controllers in the plant 5 may provide any suitable number of analog or digital outputs based on any suitable number of analog or digital inputs. Inputs to control function blocks and control routines utilized in the plant 5 may be parameter values received from field devices (e.g., via analog input blocks or discrete input blocks) or parameter values received from other control function blocks or other control routines. Likewise, outputs provided by control function blocks and control routines implemented by controllers in the plant 5 may be parameter values or commands that are provided as inputs to other control routines or blocks (e.g., discrete or analog output blocks providing the parameters or commands to field devices, control function blocks such as PID blocks or discrete control blocks, etc.). While the control routine 500 includes the PID function block 506, it will be appreciated that control routines created using the system 101 and implemented at the plant 5 may utilize other types of control function blocks.

In any event, a designer may design the routine 500 and other control routines implemented by the controllers described herein using the system 101. Specifically, a designer may design a routine by adding to a "canvas area" visual representations of blocks he or she wants included in the routine, interacting with the visual representations to configure parameters and logic associated with the blocks (e.g., by clicking on a visual representation to activate a drop-down menu that enables such configuration), and establishing connections between inputs and outputs of blocks to thereby define the flow of information between the blocks and consequently facilitate the design of the logic of the broader control routine.

For example, with reference to the control routine 500 specifically, the designer may drag a generic PID block template (not shown) onto the canvas area to instantiate the PID function block 506 shown in FIG. 1B. At a high level, a PID block includes logic for driving a process variable (PV) or controlled variable (CV), such as a temperature level for fluid in a tank, to a desired level or setpoint (SP) by manipulating a manipulated variable (MV), such as a valve position for a control valve on an inlet hot water line. The generic PID block template is configured to: (i) calculate an error 514 between a setpoint 512 and a measured process variable 514; and (ii) apply a proportional term 518, an integral term 520, and/or a derivative term 522 to the error 516 to produce an output value 526. Generally speaking, the output value 526 represents an additional change to the MV needed to move the PV 514 closer to the setpoint. As an example, a PID block may gradually open a valve over time to avoid overshooting the SP 512, and may consequently rely on feedback of the measured PV 514 to incrementally command a valve open more and more (or less and less as the PV 514 nears the SP 512). When the error 514 is zero, the output 526 will be zero, indicating no further change is necessary to achieve the desired SP 512.

When the designer instantiates the function block 506, she may configure the parameters 518-522 to affect the behavior of the function block 506. For example, the designer may change one or more of the terms 518-522 to cause the block 506 to more aggressively reach the SP 512 at a higher risk of both overshooting the SP 512 and developing oscillation, or may change one or more of the terms to cause the controlled variable to reach the SP 512 at slower and more conservative rate that is less likely to lead to overshoot and/or oscillation.

The input blocks 502 and 504 may be instantiated by dragging and dropping template AI blocks onto the canvas area and binding each of them to a tag. For example, a designer may bind the AI block 504 to a system tag (e.g., TI-093) unique to a field device measuring the PV (e.g., a temperature) that the designer wants to use as the measured PV 514 for the PID block 506. The user may then draw a link between the AI block 504 and the PV 514 of the function block 506 to cause the AI block 504 to feed the PV 514. A system tag may similarly be bound to the AI block 502. In some cases, a designer may use a tag representing variable that can be changed by the user (e.g., to adjust the setpoint). In some cases, rather than using the AI block 502 as input for the SP 112, the designer may utilize the output of a second function block, thereby implementing cascade control.

Finally, the output block 508 may be instantiated by dragging and dropping a template AO block onto the canvas area and binding it to a tag (e.g., a tag unique to the previously described control valve). The designer may then link the output 526 to the block 508 so that the PID block 506 feeds to AO block 508.

The control system 5 may include a number of other block templates that are configured to use a particular routine or logic configured to derive an output, as well as other control routines that are developed by linking one or more input blocks, control blocks, or output blocks created from templates.

Example Logic Configuration GUIs

FIGS. 6-14 show example wireframes or screenshots of logic configuration GUIs that may be presented by the configuration tool 101 to facilitate designing controller configurations (such as the configuration 242) and logic for the controller configurations (e.g., the logic 223, the logic 243, and the control routine 500 shown in FIGS. 2, 3, and 5).

Figure 6:
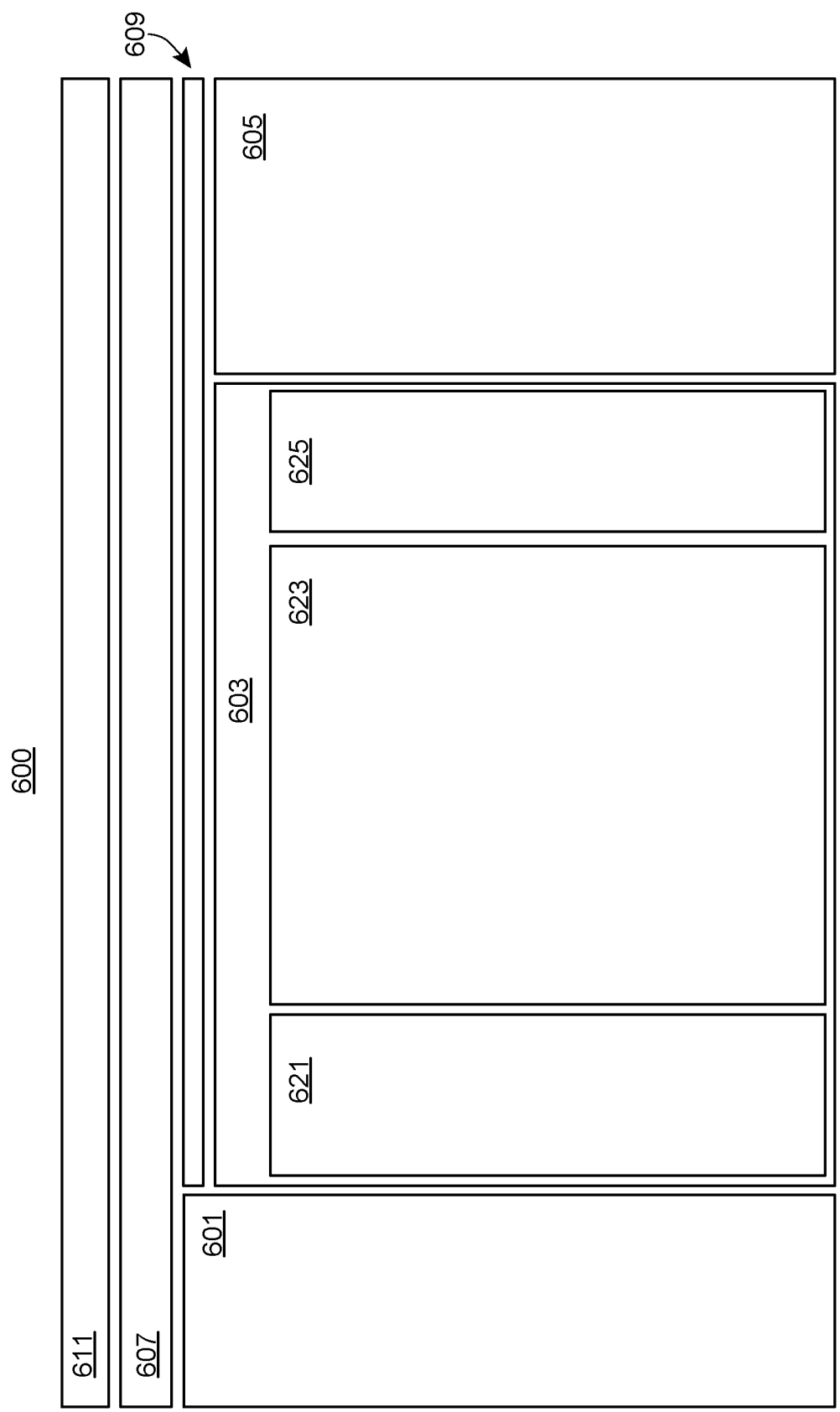
FIG. 6 is an example wireframe of the logic configuration GUI shown in FIG. 2A that may be presented by the configuration tool to facilitate designing controller configurations and logic for the controller configurations.

FIG. 6 shows an example wireframe 600 of the logic configuration GUI 210 that may be presented by the configuration tool 101 to facilitate designing controller configurations (such as the configuration 242) and logic for the controller configurations (e.g., the logic 223, the logic 243, and the control routine 500 shown in FIGS. 2, 3, and 5).

The GUI 210 shown in FIG. 6 includes: a navigation area 601, a canvas area 603, a preview area 605, a toolbar 607, a tab bar 609, and a title bar 611. The canvas area 603 includes an input block area 621, a control block area 623, and an output block area 625.

Figure 8:
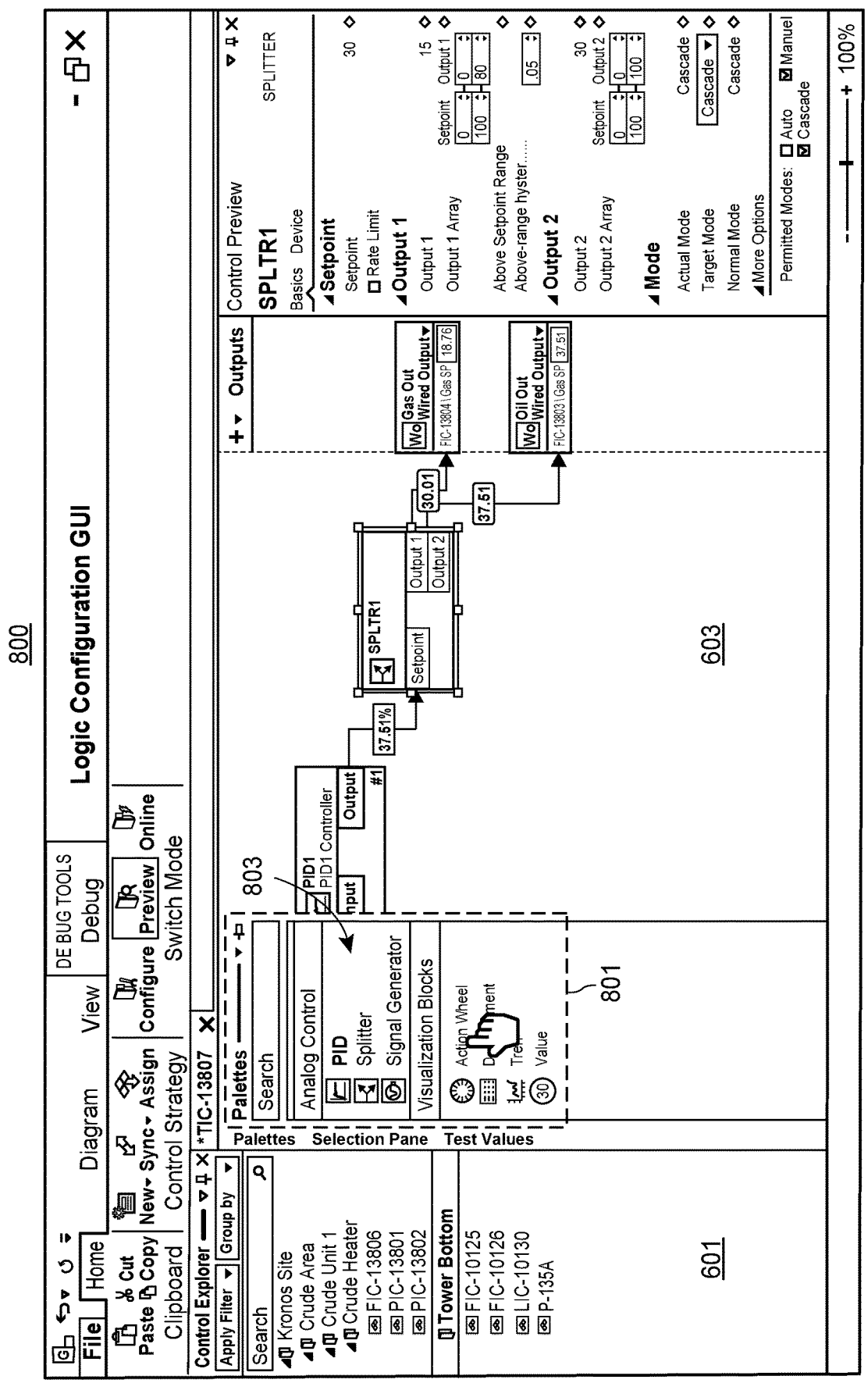
FIG. 8 is an example screenshot of a logic configuration GUI, including a palette palette that is activated in response to an interaction with the tab shown in FIG. 7.

The navigation area 601 generally displays a file hierarchy that a user may interact with to select a control routine to design or configure. The hierarchy may indicate the relative controller, unit, area, or plant within which a given control routine is assigned. In some instances, the navigation area 601 instead becomes or displays a library area, which may be activated by interacting with an element in the GUI 210 (e.g., an element in the toolbar 607 or canvas area 601). In other instances, the library area may be located elsewhere within the GUI 210. For example, FIG. 8 shows an example 800 including a library area 801 between the navigation area 601 and the canvas area 603.

The library area displayed by the GUI 210 (e.g., the library area 601) generally includes a set of icons or graphics representing the template function blocks (e.g., the templates 215 shown in FIG. 2A). The template function blocks 215 may include template input blocks (e.g., template AI and DI blocks), template control blocks, or template output blocks (e.g., template AO and DO blocks). Examples of template control blocks include template PID blocks, arithmetic blocks, integrator blocks (INT), input selector (ISEL) blocks, signal characterizer (SGCR) blocks, internal model control (IMC) blocks, or any other block representing a particular model (e.g., adaptive control models, neural network models, etc.), a particular algorithm, a particular set of logic, or a particular function.

Returning to FIG. 6, the canvas area 603 generally represents a design area in which a user can place one or more of the graphics representing templates 215 where the user can (i) interact with the placed graphics to instantiate or otherwise cause the graphics to represent a particular function block (e.g., by binding input or output blocks to signal tags) and (ii) link the placed graphics to define a control routine (e.g., one of the control routines 223 or 243 shown in FIGS. 2A and 3). For example, a user may design the control routine 243 by (i) dragging an AI block template and an AO block template from the library area into the canvas area 603 to create the AI block 321 and AO block 325 and interacting with the blocks 321 and 325 to bind them to unique tags representing a signal transmitted by the LT1 transmitter and a signal received by the CV1 valve, respectively; (ii) dragging a PID block template from the area 601 into the canvas area 603 to create the PID block 323 (e.g., and interacting with the graphic to set or modify various parameters for the blockv323, such as the proportional or integral term); and (iii) linking the output of the AI block 321 to the input of the PID block 323 and linking the output of the PID block 323 to the input of the AO block 325.

During preview mode, the canvas area 603 may display values near lines connecting the blocks to indicate a value that a first block is passing to a second block. For example, the system 101 may initiate preview mode while the control module 243 is shown in the canvas area 603. Accordingly, the canvas area 603 may display a first value being passed from the AI block 321 to the PID bock 323 representing a tank level measured by the LT1 indicator (e.g., 55% full) and a second value being passed from the PID block 323 to the AO block 325 representing a command to the CV1 valve (e.g., a command to adjust CV1 to 65% open). If desired, a user may interact with any of these displayed values to "inject" a new, manual value. For example, a user may interact with the first value showing 55% to change the first value to 45%. This causes the PID block 323 to receive the manually injected value instead of the actual measured value. A similar process may take place regarding the second value being passed to the AO block 325. This injection of manual values enables a user to test the logic of the control routine 243 while she is designing it. For example, if changing one of the injected values causes the valve CV1 to adjust to a position that overfills the tank or that allows the tank level to fall below a minimum level, the user can redesign the routine 243 to avoid the undesired behavior (e.g., by adding or removing blocks, by changing settings on control blocks such as the PID block 323, etc.).

To facilitate easier identification of types of blocks in a designed control routine, when a user drags a template from the library area to the canvas area 603, the system 101 may automatically place input blocks in the input area 621, control blocks in the control area 623, and output blocks in the area 625. In some instances, the areas 621-625 are not explicitly designated by visible lines. In others, lines distinguishing the areas 621-625 are visible.

Staying with FIG. 6, the preview area 605 may display information pertaining to one or more blocks shown in the canvas area 603 (e.g., in response to a user interacting with a block in the canvas area 603). The displayed information may include one or more process values being passed or received by the block, a tag bound to the block, a scaling parameter, a linearization parameter, various operation or diagnostic parameters, etc. A user may interact with the displayed information to inject a manual value in place of the value presently shown (e.g., a value received via a signal from a field device).

The toolbar 607 may display various interactive elements that cause the system 101 to perform an action. For example, the toolbar 607 may include a "Preview" button that activates the preview area 605. The toolbar 607 may include an "Online" button that deactivates all manual values that have been injected to the displayed control routine and that causes the canvas area 603 to display online values being passed between blocks.

The tab bar 609 displays tabs for one or more windows displaying a canvas area 603, each representing a different control routine.

The title bar 611 may include elements to cause the system 101 to undo or redo a previous activity, or to access various options associated with the system 101 and GUI 210.

In some instances, one or more of the elements 601-625 may be collapsible or hidden at any given time. For example, in some instances the preview area 605 may be manually or automatically deactivated at certain times or based on certain triggers. For example, a user may interact with an "exit" element (e.g., positioned at the top right of the area 605) to hide or deactivate the area 605. This may result in the canvas area 603 stretching to occupy the area formerly occupied by the area 605. Similarly, a user may activate any one or more of the area 601-623 when they are hidden or deactivated. For example, the toolbar 607 may include a "Preview Mode" button or element that causes the area 605 to activate.

Note, the GUI 210 may be configured in different manners depending on the implementation, and may not include any one or more of the elements 601-623 if desired. Further, depending on the implementation, the GUI 210 may include elements or areas not shown. Each of the FIGS. 7-14 show screenshots of the GUI 210 including the same or similar components/areas as those shown in FIG. 6. These same components/areas may not be labeled with a reference number unless directly relevant to the discussion below.

Figure 7:
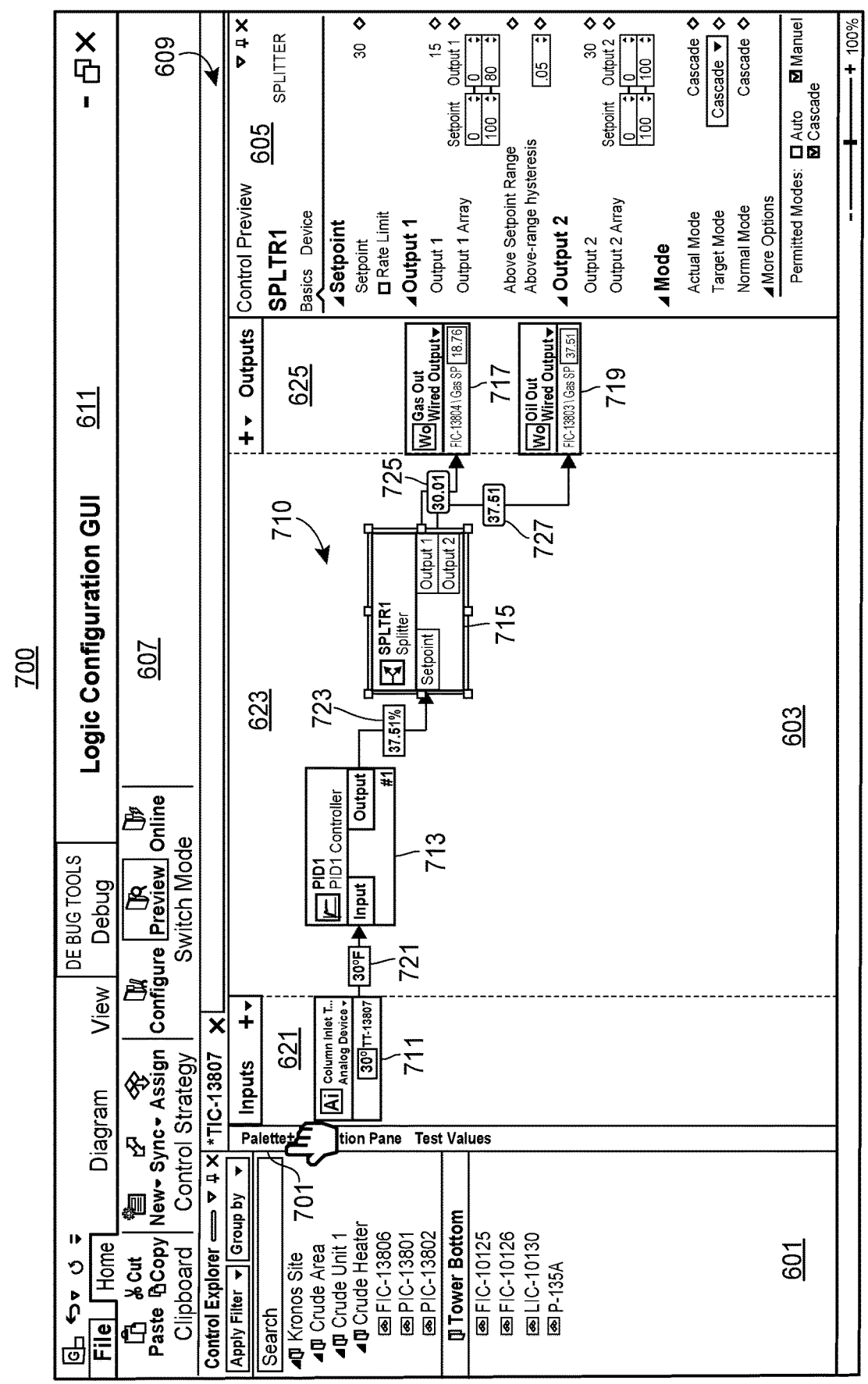
FIG. 7 is an example screenshot of a logic configuration GUI in which a user is interacting with a tab to open a palette of graphic templates that may be utilized to facilitate building controller configuration.

FIG. 7 shows an example screenshot 700 of the GUI 210 in which a user is interacting with a tab 701 to open a palette of graphic templates that may be utilized to facilitate building controller configuration. Note, the screenshot 700 includes the same areas and elements 601-625 as shown in FIG. 6.

The screenshot 700 also shows an example routine 710 in the canvas area 603 that a user may edit. The routine 710 includes an input block 711, control blocks 713 and 715, and output blocks 717 and 719. A set of fields 721-727 display values of parameters passed between blocks. For example, the field 721 displays a value of a parameter passed form the input block 711 to the control block 713. If desired, a user can interact with the field 721 (e.g., by clicking or double clicking) to activate a manual mode in which a user can cause a user-defined value to be passed to the block 713 instead of the value being output by the block 711 (e.g., which may correspond to an actual measurement obtained by a field device corresponding to the block 711). This may be helpful if the user is interested in testing how the routine 710 responds to receiving a range of different input values from the lock 711.

In operation, a user may interact with an element 701 (e.g., a tab) to activate a library area or a palette displaying various template function blocks that the user can drag into the canvas area 603 and configure. An example palette that may be displayed in response to the interaction with the element 701 is shown in FIG. 8.

FIG. 8 shows an example screenshot 800 of the GUI 210, including a palette 801 that is activated in response to an interaction with the tab 701 shown in FIG. 7. The palette 801 includes multiple function block templates 803, including a PID template (including template logic for implementing PID control), a splitter template (this is used for 'split range control;' a splitter function block takes a single input and calculates two outputs; this allows an integrating (e.g. PID) controller to drive two outputs without winding up (saturating) when either or both outputs are limited), and a signal generator template.

If desired, the palette 801 may also include input function blocks (e.g., AI and DI blocks), output function blocks (e.g., AO and DO blocks), and control function blocks not show in FIG. 8 (e.g., arithmetic blocks, integrator blocks, etc.). At some point, a user may wish to activate a "preview mode" in which a preview pane is shown to display testing or preview data relevant to the configuration of the routine 701. An example technique for activating a preview pane is shown in FIG. 9.

Figure 9:
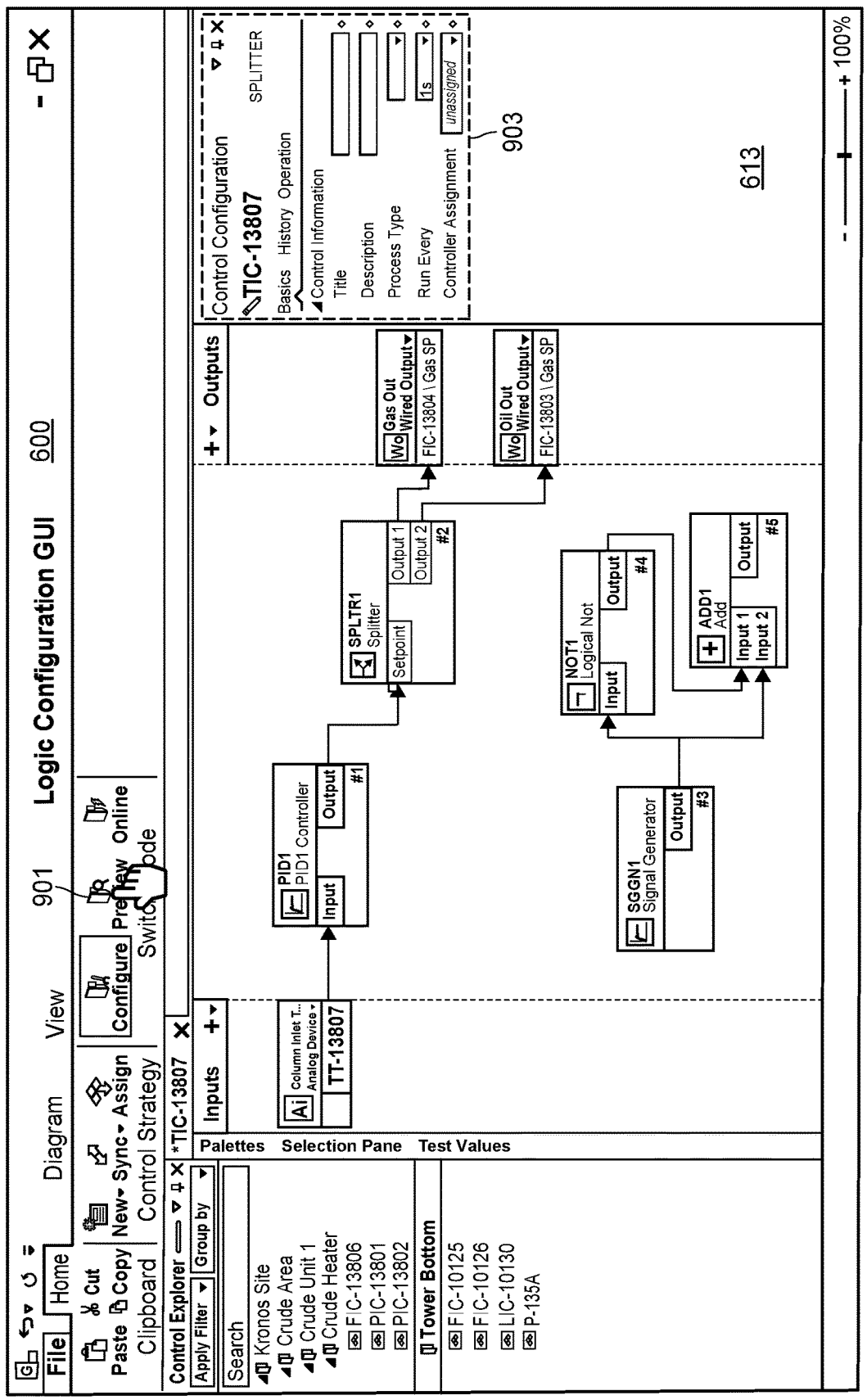
FIG. 9 is an example screenshot of a logic configuration GUI in which a user is interacting with an element to activate a preview pane (not shown).

FIG. 9 shows an example screenshot 900 of the GUI 210 in which a user is interacting with an element 901 to activate a preview pane (not shown). As shown in FIG. 9, prior to the user's interaction, the GUI 210 may show an information pane 903 pertaining to an object in the canvas (e.g., an object with which a user has interacted). For example, in this case, the information pane 903 includes information pertaining to the PID block 713 that is also shown in FIG. 7 (the TIC-13807 in this case). Note, TIC stands for "temperature indicating controller." In any event, interacting with the element 901 may cause the system 101 to display a preview pane similar to that shown in FIG. 10.

Figure 10:
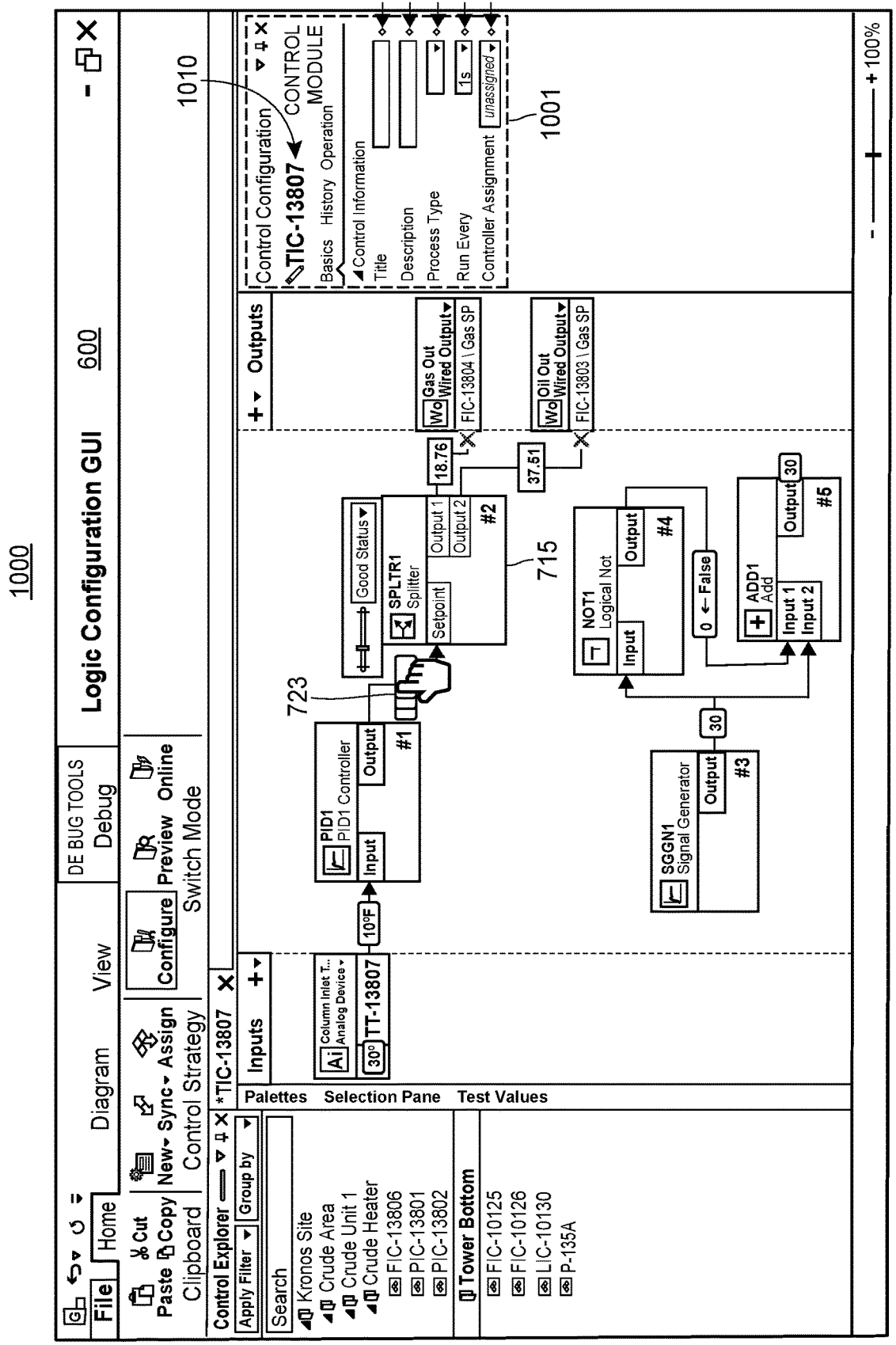
FIG. 10 is an example screenshot of logic configuration GUI in which: (i) a preview pane is displayed in response to the user interaction with the element shown in FIG. 9, and (ii) a user is interacting with a graphic element to inject a test value to be passed to a function block.

FIG. 10 shows an example screenshot 1000 of the GUI 210 in which: (i) a preview pane 1001 is displayed in response to the user interaction with the element 901 shown in FIG. 9, and (ii) a user is interacting with the graphic element 723 to inject a test value to be passed to the block 715.

The preview pane 1001 may show information pertaining to the routine 701 in addition to or instead of showing information pertaining to one or more of the blocks making up the routine 701. For example, the routine or module 701 has a unique identifier or tag "TIC-13807" in this case. FIG. 10 displays this tag in the field 1010. The preview pane 1001 may include fields displaying other information about the routine 710, including a title field 1011 (not yet configured here; this may be the user-friendly text one would prefer the plant operator to see in their runtime GUI (e.g. faceplate) instead of or in addition to the tag (e.g., TIC-13807); an example title is 'Tower Bottom Temperature'); a description field 1013 (not yet configured); a process type field 1015 (not yet configured; e.g., "temperature control"); a run frequency field 1015 (set to 1 second in this case); and a controller assignment field 1019 (the routine 701 has not yet been assigned to a controller in this example, so the field 1019 is blank).

Figure 11:
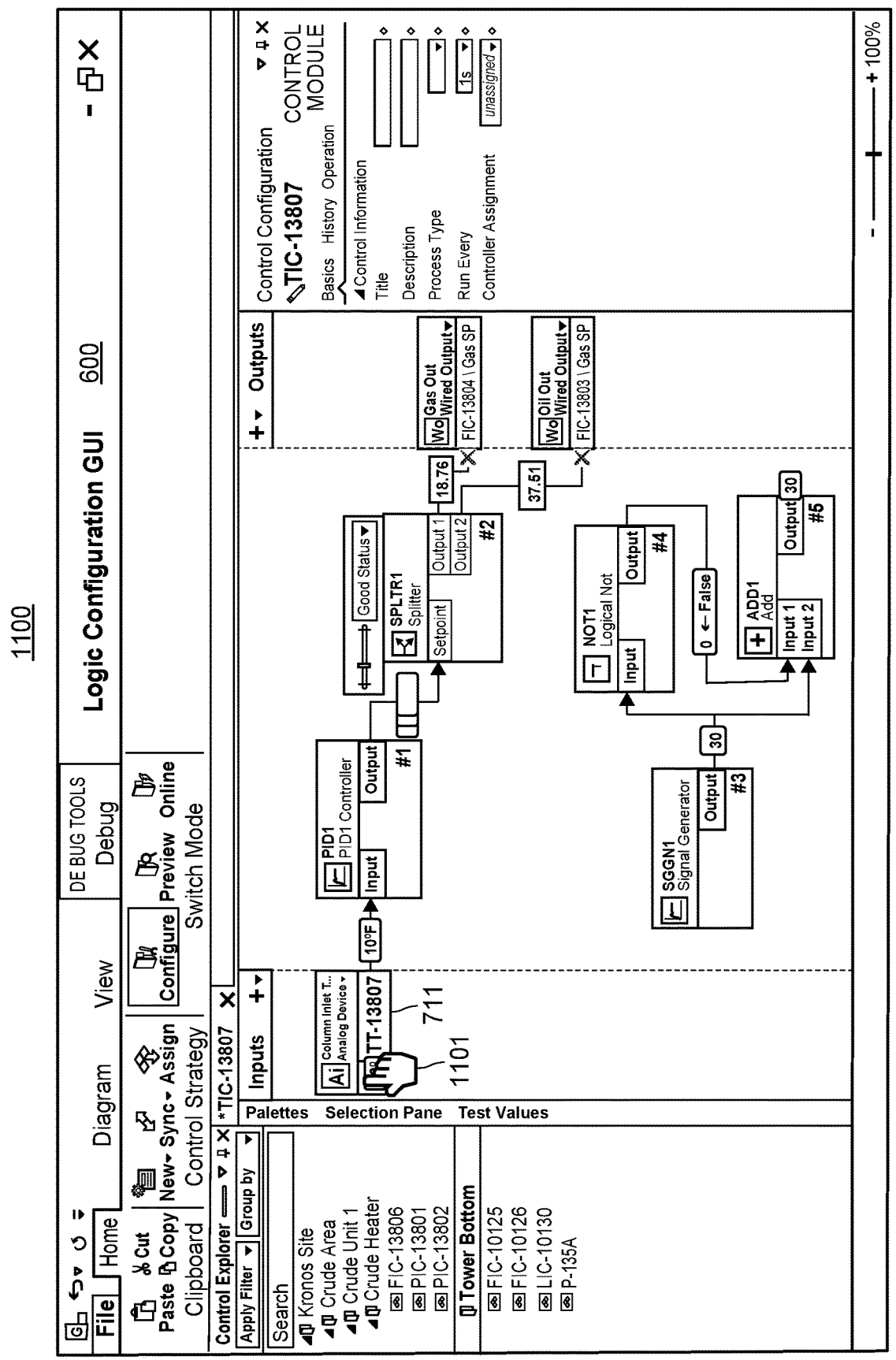
FIG. 11 is an example screenshot of the logic configuration GUI in which a user is interacting with a graphic element via a cursor to activate a preview pane for an object corresponding to the graphic element.

FIG. 11 shows an example screenshot 1100 of the GUI 210 in which a user is interacting with the graphic element 711 via a cursor 1101 to activate a preview pane for an object corresponding to the graphic element 711. An example preview pane 1201 is shown in FIG. 12.

Figure 12:
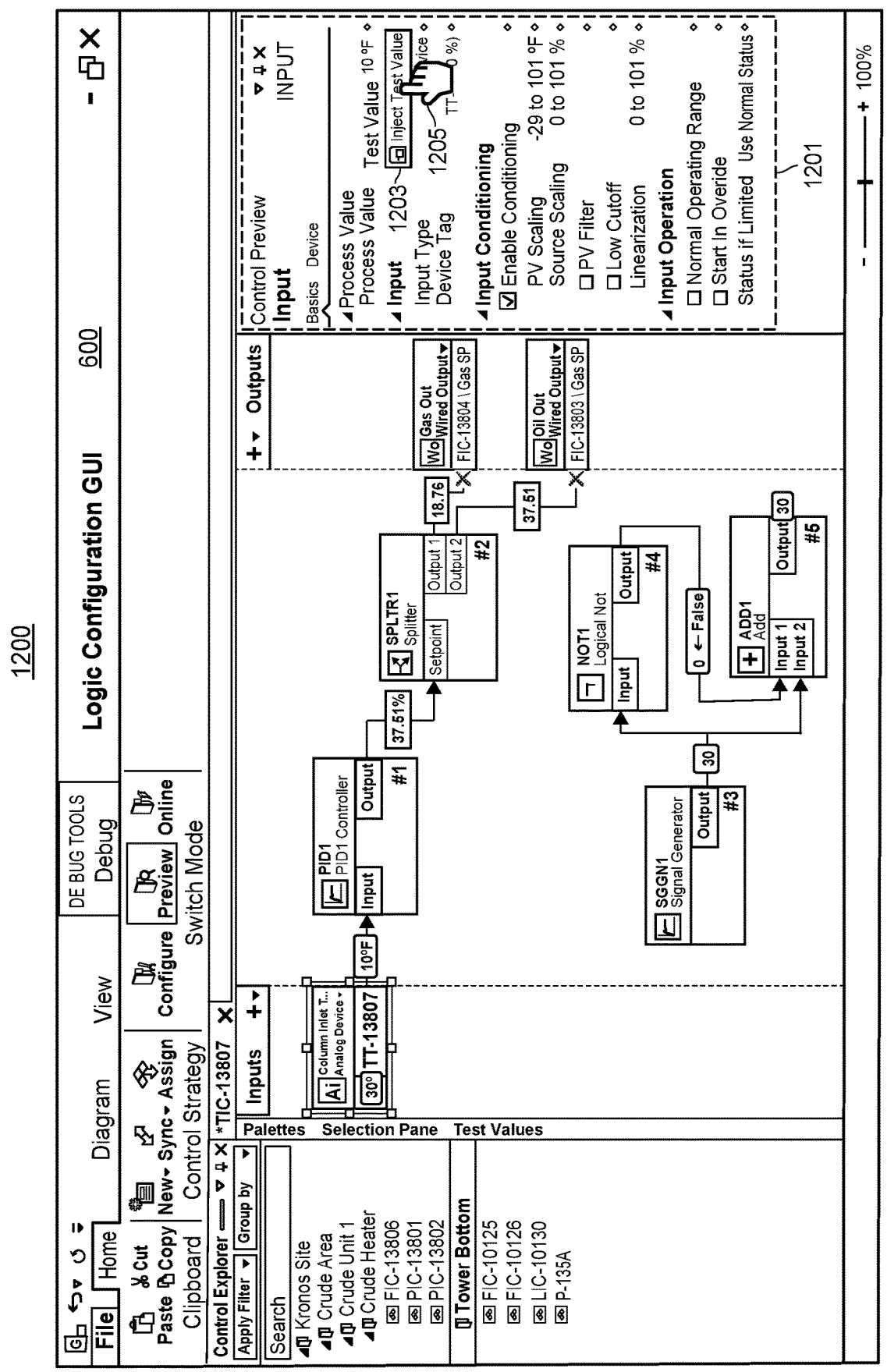
FIG. 12 is example screenshot of the logic configuration GUI, showing a user interacting with a field via a cursor to inject a test value.

FIG. 12 shows an example screenshot 1200 of the GUI 210, showing the preview pane 1201 provided in response to a user interacting with the element 711 as shown in FIG. 11. Further, FIG. 12 shows a user is interacting with a field 1203 via a cursor 1205 to inject a test value to the input represented by the field 1203.

Figure 13:
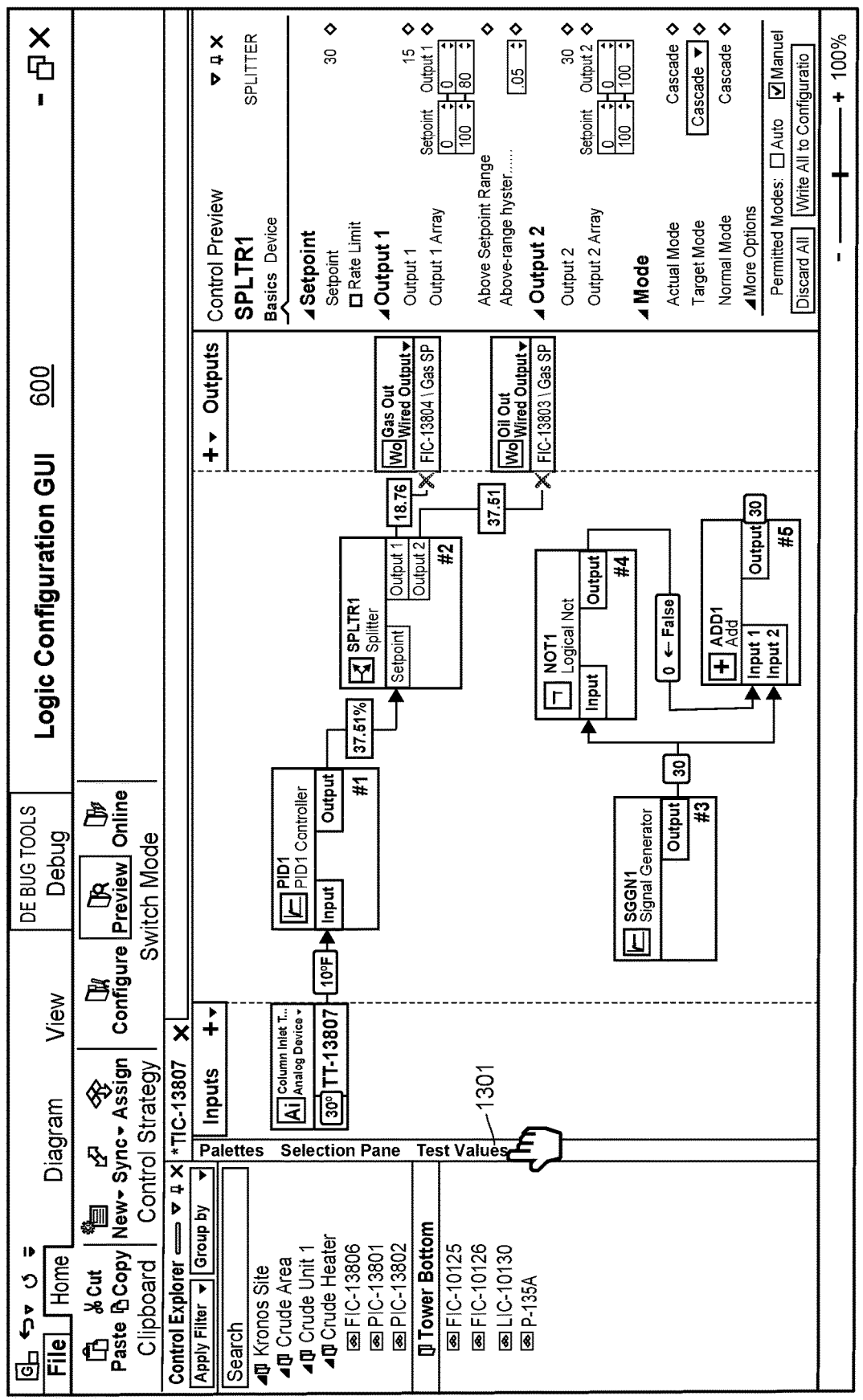
FIG. 13 is an example screenshot of the logic configuration GUI in which a user is interacting with a tab to activate a pane for viewing test values utilized in testing a control routine.

FIG. 13 shows an example screenshot 1300 of the GUI 210 in which a user is interacting with a tab 1301 to activate a pane for viewing test values (not shown) being utilized in testing the control routine shown in the GUI 210. An example test value pane 1401 is shown in FIG. 14.

Figure 14:
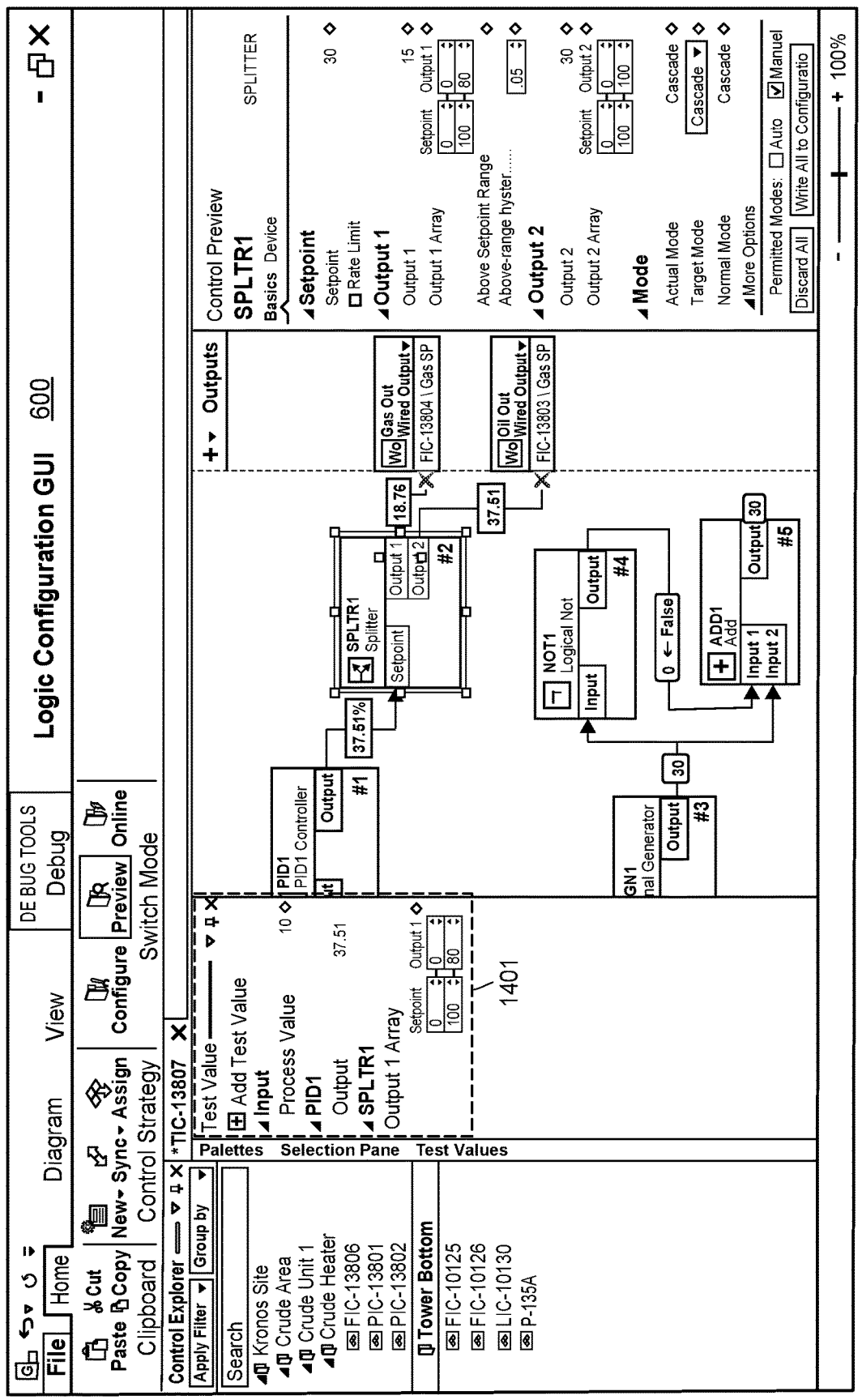
FIG. 14 is an example screenshot of the logic configuration GUI, including a pane that is activated after a user interacts with a tab shown in FIG. 13.

FIG. 14 shows an example screenshot 1400 of the GUI 210, including a pane 1401 that is activated after a user interacts with the tab 1301 shown in FIG. 13.

Example Graphics Configuration GUIs

FIGS. 15-22 show example screenshots of graphics configuration GUIs that may be presented by the configuration tool 101 to facilitate designing process modules (e.g., the process modules 224 and 244 shown in FIG. 2A) and operator GUIs representing process modules (e.g., the GUIs 212 and 246 shown in FIGS. 2A and 4).

Figure 15:
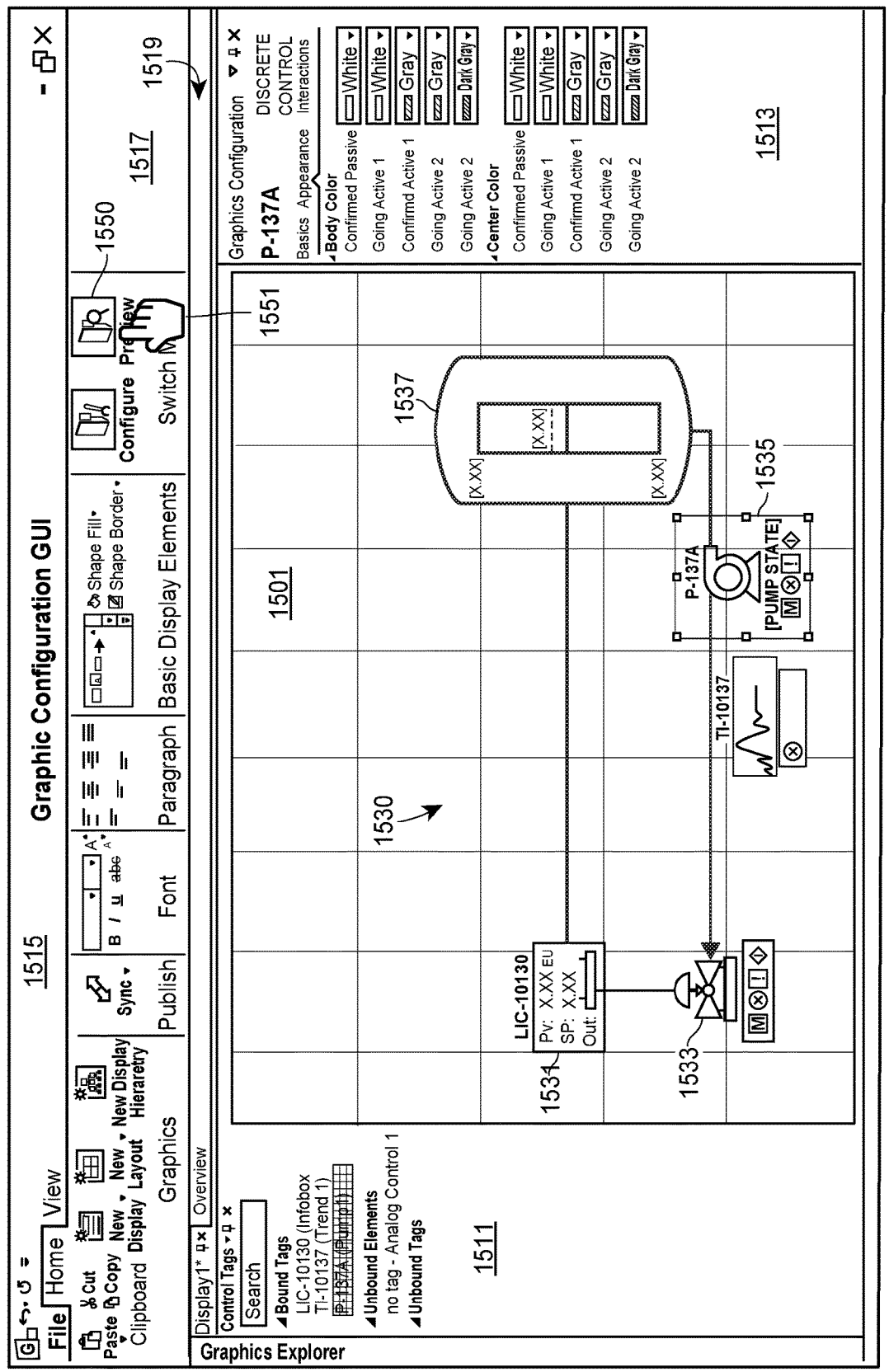
FIG. 15 is example screenshot of the graphics configuration GUI shown in FIG. 2A that may be presented by the configuration tool to facilitate designing process modules and process module GUIs, showing a user interacting with an element to activate a preview pane.

FIG. 15 shows an example screenshot 1500 of the graphics configuration GUI 212 (also shown in FIG. 2A) that may be presented by the configuration tool 101 to facilitate designing process modules and process module GUIs. As noted, the process module GUIs (e.g., the GUI 244 shown in FIG. 2A) created using the GUI 212 may be shown during operation as an operator display to facilitate an operator's monitoring and control of the process module depicted by the process module GUI.

The first area 1501 may be a canvas area in which a user places and connects various elements or graphics 1531-1537 to define a process module GUI 1530 (and, potentially, define a corresponding process module). Here, the GUI 1530 includes: (i) a level indicator graphic 1531 that is configured to display a level measured by a corresponding level indicator and a setpoint for the level; (ii) a valve graphic 1533 that may display a status of a corresponding valve (e.g., via color); (iii) a pump graphic 1535 that may display a status of a corresponding pump (e.g., via a color); and (iv) a tank graphic 1537 that may display a status of a corresponding tank (e.g., the level measured by the level indicator).

The second area 1511 may be a "tag information area" configured to display information about tags (e.g., unique identifiers) bound to components represented by the graphics shown in the canvas area 1501. For graphics that have not yet been bound to any particular equipment, the fields in the area 1511 may show that these graphics are "unbound elements."

The third area 1513 may be a "configuration area" in which a user can configure information particular to any of the graphics 1531-1537 placed in the canvas area 1501. For example, a user may click on the graphic 1535 to cause the tool 101 to display, in the configuration area 1513, interactive fields for editing information about the graphic 1535 or the equipment represented by the graphic 1535 (e.g., the pump "P-137A" in this case). As an example, a user may interact with fields shown in the area 1513 to edit the colors of various sub-elements in the graphic 1535 (e.g., the body color and the center color). If desired, colors may be context specific. That is, a user may edit the properties of the graphic 1535 so that when the GUI 1530 is displayed, the colors of the sub-elements of the graphic 1535 depend on the values of one or more parameters (e.g., representing the status of the pump P-137A, such as whether or not the pump is active, going active, not active, malfunctioning, etc.).

Staying with FIG. 15, a cursor 1551 is shown interacting with a "preview" button 1550 included in the toolbar 1517. Interacting with the button 1550 may cause the tool 101 to display a preview pane 1601, an example of which is shown in FIG. 16.

Figure 16:
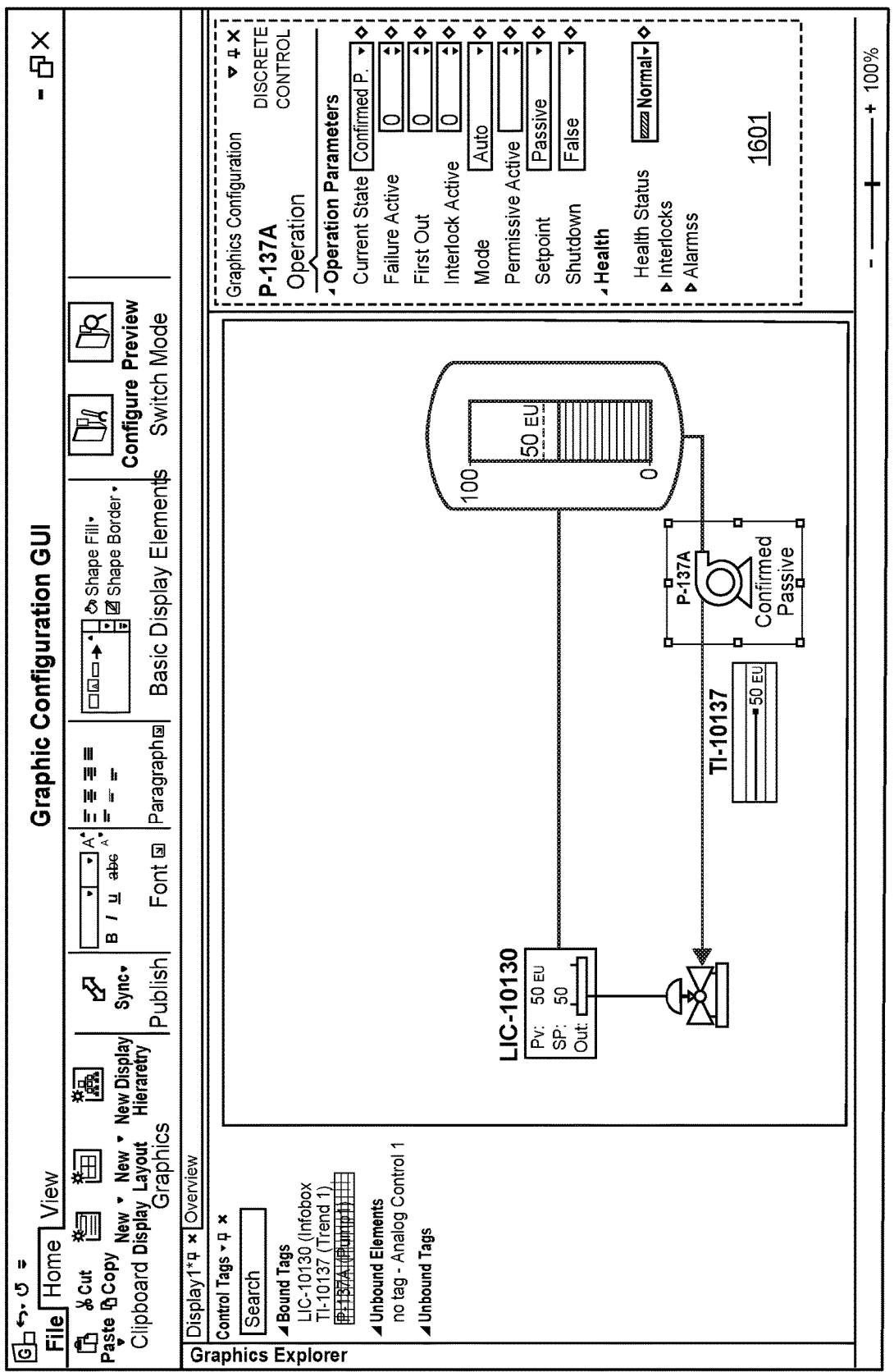
FIG. 16 is an example screenshot of the graphics configuration GUI, including a preview pane that is activated in response to a user interaction with the element shown in FIG. 15.

Turning to FIG. 16, an example screenshot 1600 of the GUI 212 is shown, including a preview pane 1601 that is activated in response to a user interaction with the element 1550 shown in FIG. 15. The preview pane 1601 may include one or more fields displaying values for operation parameters. Example operation parameters include alarm parameters, interlock parameters, health parameters (e.g., a health index), and operator parameters. The operator parameters may include parameters pertaining to the represented device and relevant to an operator or an operator's primary tasks. Example operator parameters include a current state; a failure status; a first out parameter (this indicates which interlock trip condition activated first); an interlock status (e.g., showing whether the interlock is Active or Inactive); a mode parameter indicating whether the device is in auto mode (i.e., controlled by the relevant logic or control routine) or manual (i.e., controlled by an operator); a "permissive active" parameter (e.g., indicating a permissive condition that inhibits the transition from passive state to active state—an interlock may force a transition from active to passive); a setpoint parameter (e.g., passive vs active for a pump); and a shutdown status.

A user may inject a test value for any of the operation parameters, thereby overriding values measured by field devices (e.g., measured temperatures, pressures, flows, etc.) or values set by a control routine. Example values set by a control routine include output values passed from a first block to a second block (e.g., a setpoint, proportional term, an integral term, or any other suitable value) or to a field device (e.g., an output value from an AO or DO block). A user may inject a test value in a number of manners. For example, as explained below, a test value may be injected by interacting directly with graphics shown in the canvas area (as shown in FIG. 17) or by interacting with a preview pane shown next to the canvas area (as shown in FIG. 18).

Figure 17:
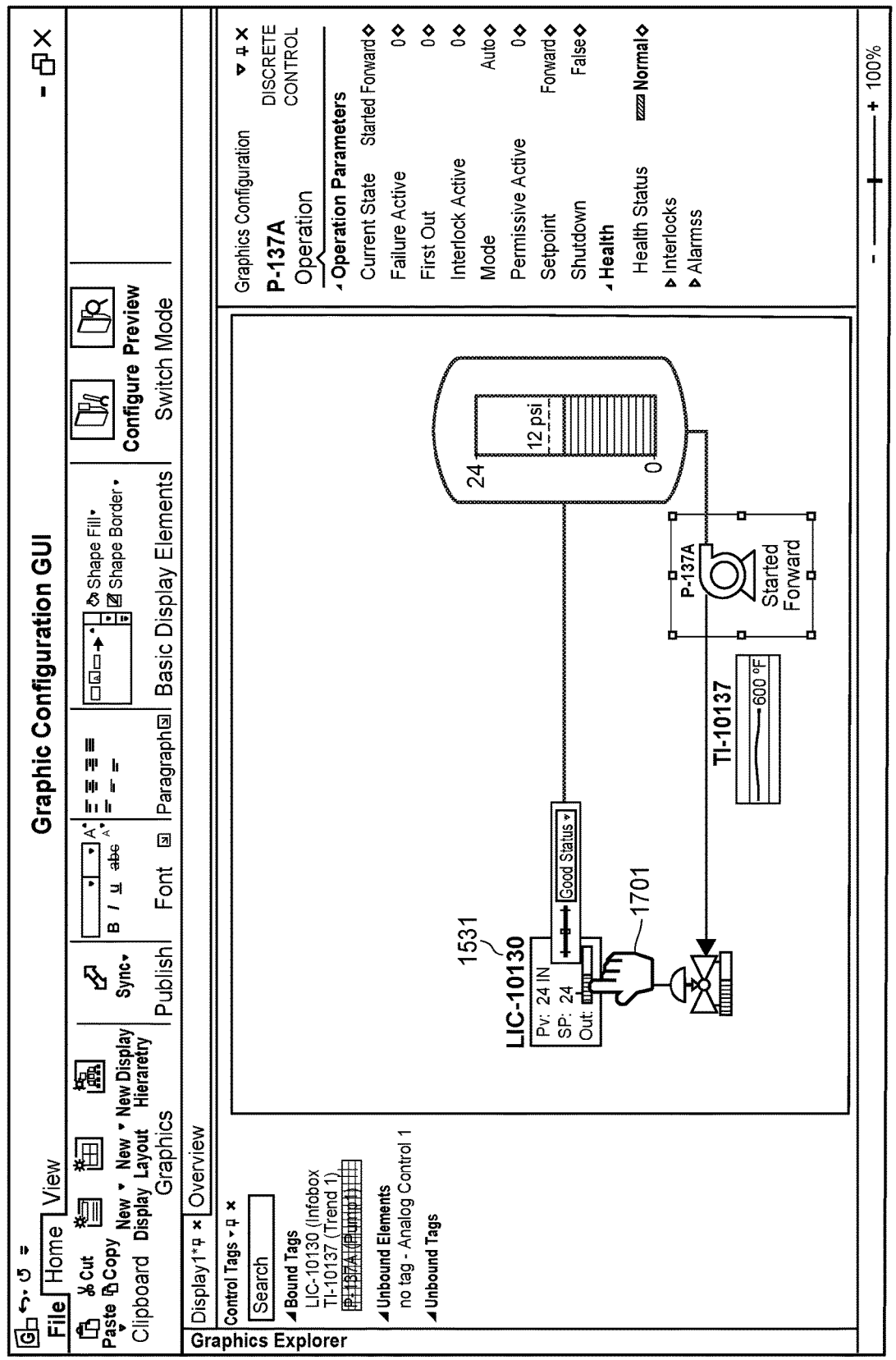
FIG. 17 is example screenshot of the graphics configuration GUI, showing a user injecting a test value for an operation parameter by interacting with a graphic in the canvas area of the GUI.

FIG. 17 shows an example screenshot 1700 of the GUI 212 in which a user injects a test value for an operation parameter by interacting with the graphic 1531 via a cursor 1701. The graphic 1531 may include one or more interactive fields that a user can interact with to inject a test value. For example, the graphic 1531 includes (i) a "PV" field displaying a measured process variable (a measured level of 24 inches in this case); (ii) a "SP" field displaying a value for a setpoint for the measured level (24 inches here, indicating the process has reached a steady state); and (iii) an "OUT" field displaying a color (which may represent a status for the level indicator represented by the graphic 1531; in some embodiments the color is not tied to status. Note, the setpoint in the "SP" field may be set by a control routine or logic being executed to control the process module (e.g., the logic 223 or 243 shown in FIG. 2A, the routine 500 shown in FIG. 5, the routine 710 shown in FIG. 7, etc.). Depending on the implementation, the logic setting the setpoint may be implemented by a controller in the plant 5 during normal operation or during a test operation, or may be implemented by a virtual controller in a testing environment. In some instances, the setpoint is set by an operator rather than a control routine. In any event, a user may inject a test value to override any one or more of these values.

Figure 18:
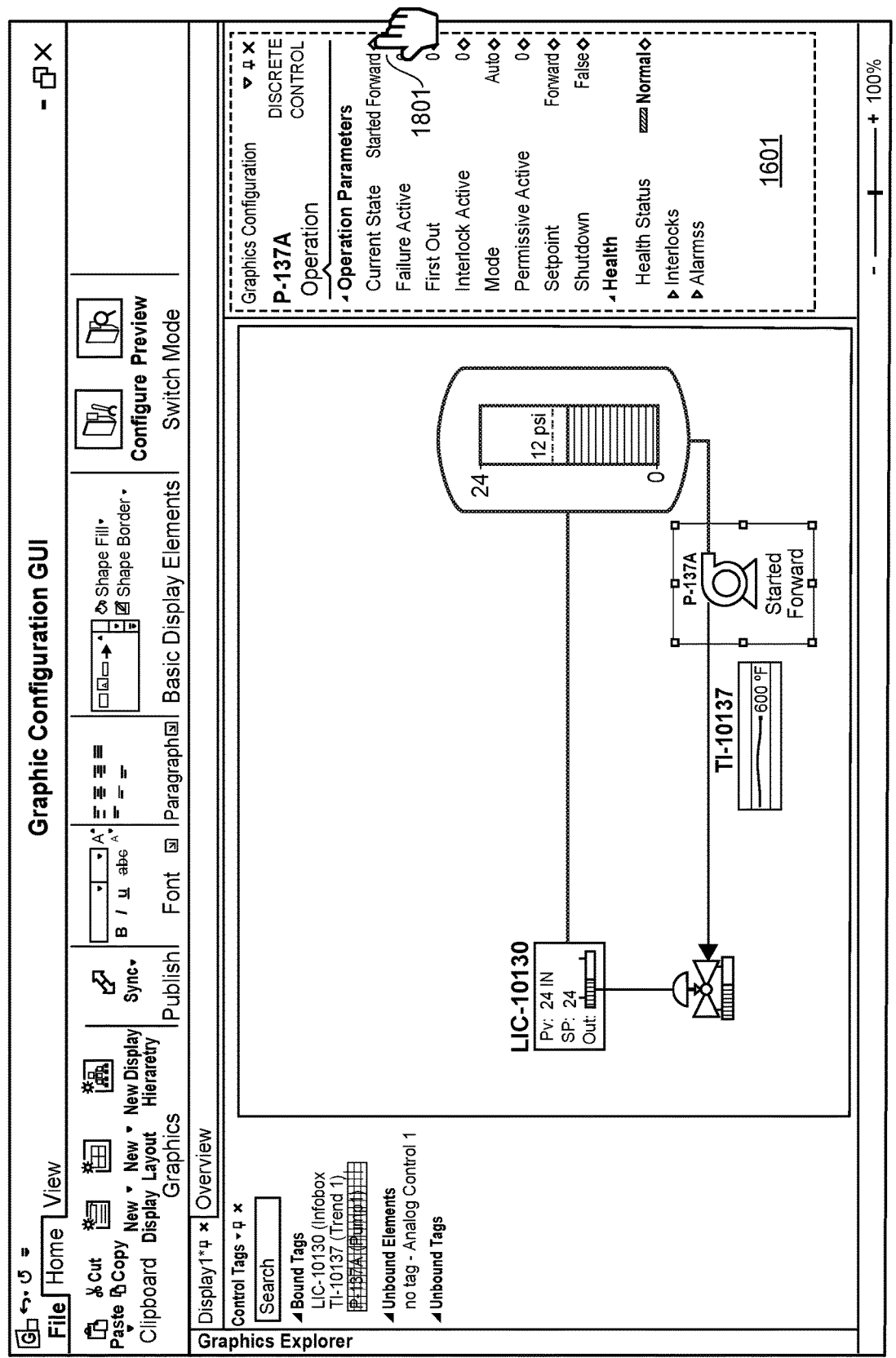
FIG. 18 is an example screenshot of the graphics configuration GUI in which a user injects a test value for an operation parameter by interacting with a field included in a preview pane 1601.

FIG. 18 shows an example screenshot 1800 of the GUI 212 in which a user injects a test value for an operation parameter by interacting with a field 1801 included in the preview pane 1601. After clicking on the field 1801, a dropdown menu may appear that includes an element labeled "Inject Test Value" or something similar. The user may click this element, and the tool 101 may respond by enabling the user to change the value in the field 1801. If desired, a dropdown menu may appear that includes values a user may inject. This action may be desirable particularly when the field 1801 represents a status with a preset number of different potential statuses. In some instances, the user may simply provide the desired value (e.g., by typing, by interacting with digits shown on the screen, by speaking the desired value, by manipulating a bar or scroll that adjusts the value, etc.).

Figure 19:
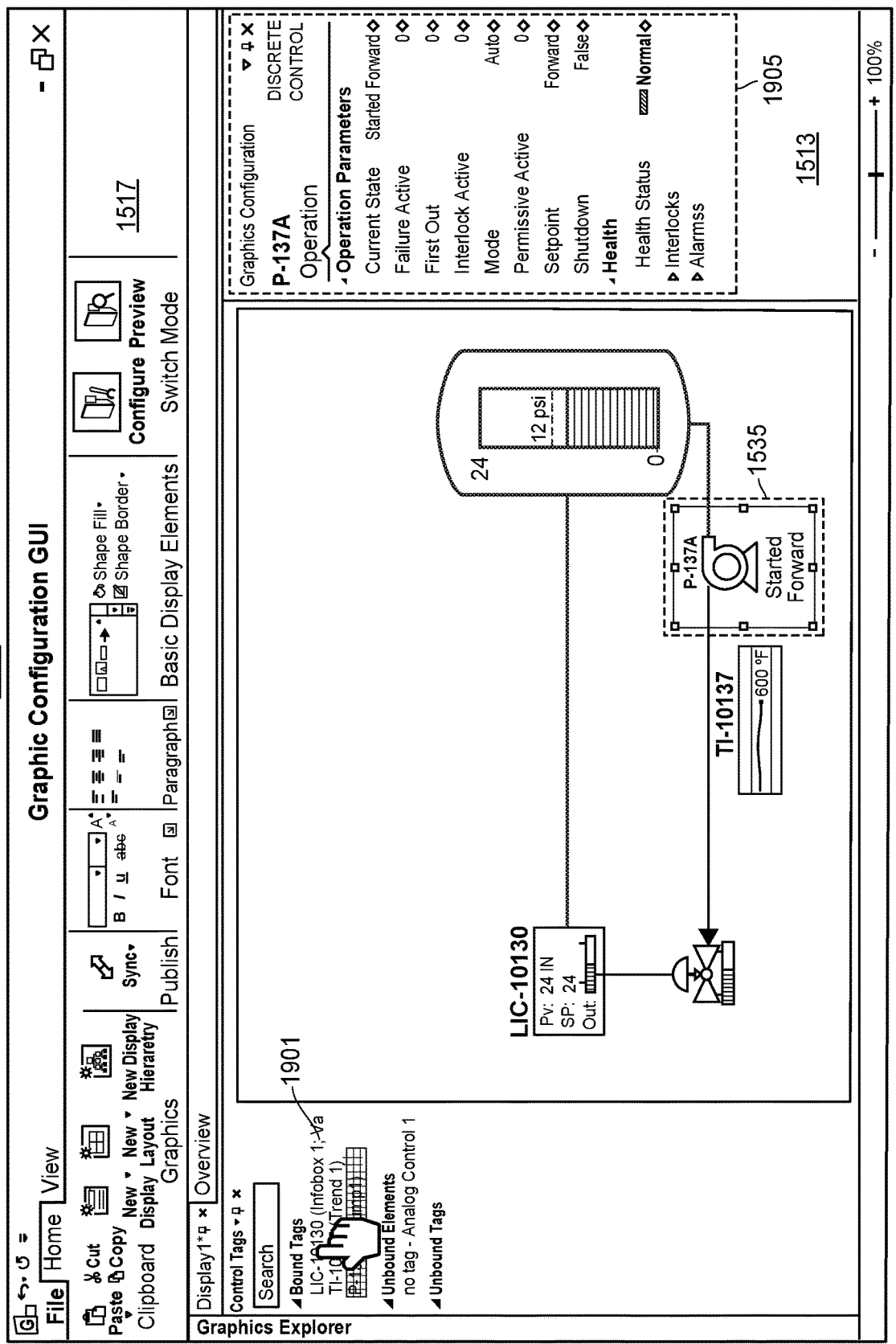
FIG. 19 is an example screenshot of the graphics configuration GUI in which a user interacts with a field for a bound tag, resulting in the GUI (i) highlighting a graphic representing the device to which the tag is bound, and (ii) displaying a preview pane showing information pertaining to the object to which the tag is bound (e.g., the pump having the tag "P-137A").

FIG. 19 shows an example screenshot 1900 of the GUI 212 in which a user interacts with a field 1901 for a bound tag, resulting in the GUI 212 (i) highlighting the graphic 1535 representing the device to which the tag is bound, and (ii) displaying in the area 1513 a preview pane 1905 showing information pertaining to the object to which the tag is bound (e.g., the pump having the tag "P-137A").

Figure 20:
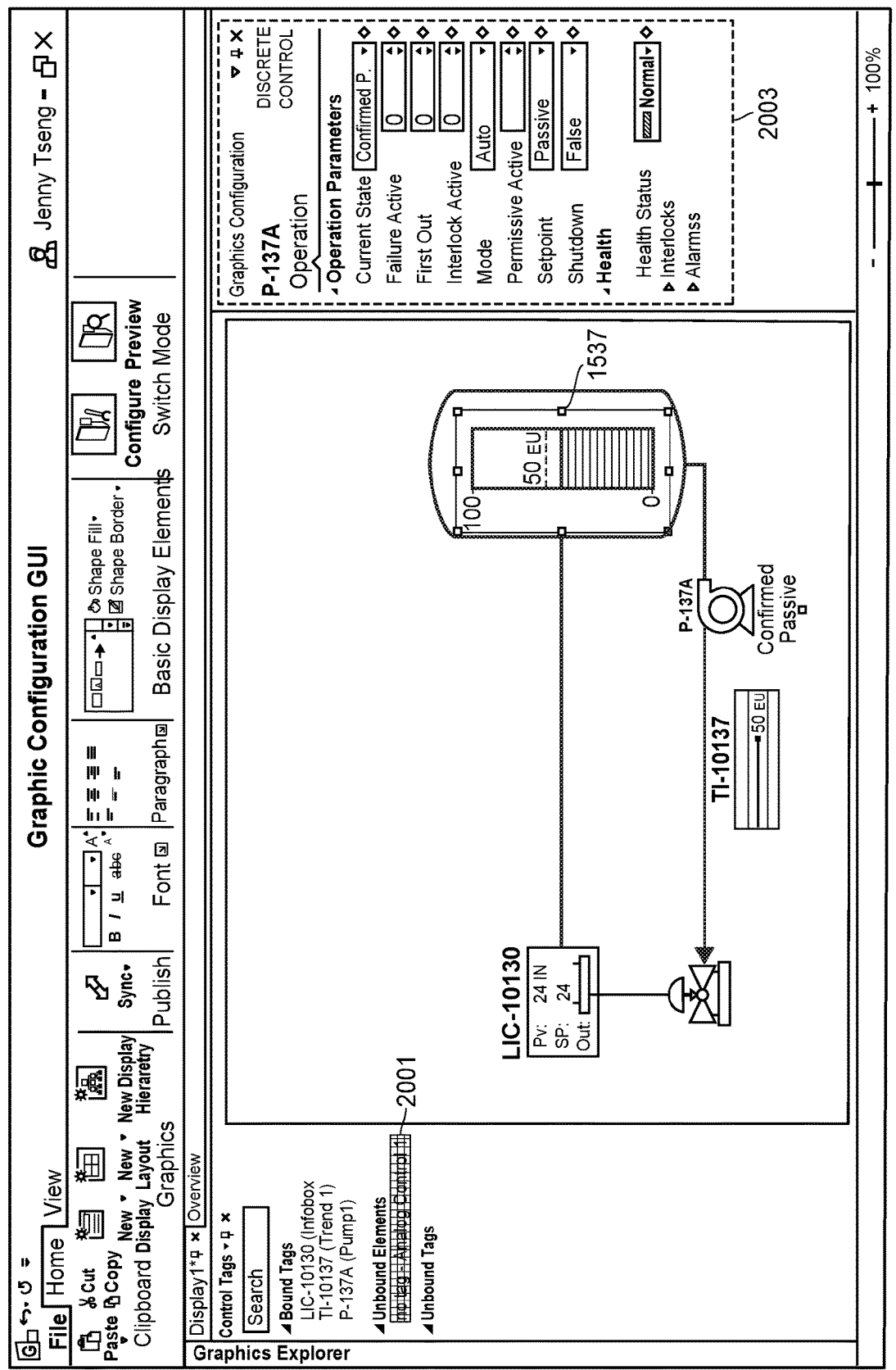
FIG. 20 is an example screenshot of graphics configuration GUI in which a user interacts with a field for an unbound tag, resulting in the GUI displaying a preview pane showing information pertaining to the unbound graphic.

FIG. 20 shows an example screenshot 2000 of the GUI 212 in which a user interacts with a field 2001 for an unbound tag, resulting in the GUI 212 displaying in the area 1513 a preview pane 2003 showing information pertaining to the unbound graphic. For example, in this case the GUI 212 shows that the level graphic 1537 is not bound to a tag. In this case, the level graphic 1537 is configured to be bound to an analog control function block (e.g., a PID block) Because the graphic 1537 is unbound to a tag, the tool 101 generates a default control block with pre-injected values. The user may interact with any field shown in the preview pane 2003 to edit the injected values associated with the graphic 1537 and the generated default control block. If desired, the user may also bind the graphic 1537 to an existing control block, which may cause the fields in the preview pane 2003 to fill with parameter values utilized by the bound control block.

Additional Considerations

Descriptions of various aspects, apparatuses, systems, components, devices, methods, and techniques for managing discrete process control elements (e.g., discrete devices, discrete communication channels, discrete signals, etc.) and for smart commissioning discrete elements in the control system 5 follow.

As discussed above, the techniques described herein help plant personnel avoid the time and labor-intensive process associated with traditional design systems for process control systems. By utilizing the configuration tool 101, a user can design, test, and "preview" control logic for controlling a process before downloading the control logic to a configuration database or process controller in the plant. This enables quick testing and improvement of control logic during the design phase, avoiding the time-consuming iterative process of designing, downloading to a database, propagating to a live controller, and testing on the physical controller. The configuration tool 101 also separates the testing of control logic for a controller configuration from the testing of non-logic aspects of the controller configuration, enabling a user to finish designing the control logic before downloading the configuration to the controller. Advantageously, after downloading a designed and tested controller configuration to a controller, a user only needs to test non-logic aspects of the configuration before implementing the controller configuration on a live process in normal operation.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Referencing the method 200 specifically, the described functions may be implemented, in whole or in part, by the devices, circuits, or routines of the system 5 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This description, and the claims that follow, should be read to include one or at least one. The singular also includes the plural unless it is obvious that it is meant otherwise.

In various embodiments, hardware systems described herein may be implemented mechanically or electronically. For example, a hardware system may comprise dedicated circuitry or logic that is permanently configured (e.g., as a special-purpose processor, such as a field programmable gate array (FPGA) or an application-specific integrated circuit (ASIC) to perform certain operations). A hardware system may also comprise programmable logic or circuitry (e.g., as encompassed within a general-purpose processor or other programmable processor) that is temporarily configured by software to perform certain operations. It will be appreciated that the decision to implement a hardware system mechanically, in dedicated and permanently configured circuitry, or in temporarily configured circuitry (e.g., configured by software) may be driven by cost and time considerations.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

General Terms and Phrases

Throughout this specification, some of the following terms and phrases are used.

Application. See "Routine."

Communication Interface. Some of the described devices or systems include a "communication interface" (sometimes referred to as a "network interface"). For example, device 205 shown in FIG. 2 includes a communication interface 205c. Each of the described communication interfaces enables the system of which it is a party to (i) send information or data to other systems or components or (ii) receive information or data from other systems or components. When a communication interface is or includes an interface configured to enable a system to couple to a peripheral device or component such as one of the UI components 205d shown in FIG. 2 (e.g., a keyboard, a monitor, an external hard drive, etc.), the interface may be referred to as a "peripheral interface" or "I/O interface" (see "I/O interface"). In some instances, one or more of the described communication interfaces may be utilized to establish a direct connection to another system (e.g., via RF such as Bluetooth or via cable such as a USB or CAT/ethernet cable). If desired, each described communication interfaces enable the system(s) of which it is a part to connect via a link to the network 10 shown in FIG. 1 or to any other suitable network (e.g., a personal area network (PAN), a local area network (LAN), or a wide area network (WAN)).

If desired, each described communication interface may include (i) circuitry that enables connection to a wired link that carries electrical or optical signals to another device (e.g., via a coax cable or fiber optic cable) and to communicate with that other device, or (ii) circuitry that enables wireless communication (e.g., short-range or long-range communication) via electromagnetic signals, such as radio frequency (RF) signals. Further, in some instances, a reference to a "communication interface" may refer to multiple interfaces for communicating with components or systems external to a system. For example, in some instances, a described communication interface may refer to a set of communication interfaces including: one or more wired communication interfaces, one or more wireless communication interfaces, one or more I/O or peripheral interfaces, or some combination thereof. The described communication interfaces and systems may conform to any one or more suitable communications protocols, standards, or technologies, such as those described herein.

Communication Protocols. In this description, communication protocols, standards, and technologies may be referred to generically as "communication protocols." Example communication protocols, standards, or technologies that may be utilized by the described systems include those that facilitate communication via nanoscale networks, near-field networks, personal area networks ("PANs"), local area networks ("LANs"), backbone networks, metropolitan area networks ("MANs"), wide area networks ("WANs"), Internet area networks ("IANs"), or the Internet.

Example near-field network protocols and standards include typical radio-frequency identification ("RFID") standards or protocols and near-field communication ("NFC") protocols or standards. Example PAN protocols and standards include 6LoWPAN, Bluetooth (i.e., a wireless standard for exchanging data between two devices using radio waves in the range of approximately 2.4 to 2.485 GHz), IEEE 802.15.4-2006, ZigBee, the Thread protocol, ultra-wideband ("UWB"), universal serial bus ("USB") and wireless USB, and ANT+. Example LAN protocols and standards include the 802.11 protocol and other high frequency protocols/systems for wireless communication in bands found in a range of approximately 1 GHz-60 GHz (e.g., including the 900 MHz, 2.4 GHz, 3.6 GHz, 5 GHz, or 60 GHz bands), as well as standards for suitable cabling such as coaxial and fiber-optic cabling. Example technologies used to facilitate wireless WANs includes those used for LANs, as well as 2G (e.g., GPRS and EDGE), 3G (e.g., UMTS and CDMA2000), 4G (e.g., LTE and WiMax), and 5G (e.g., IMT-2020) technologies. Note, the Internet may be considered a WAN.

Other communication protocols and standards that may be utilized by the system 5 include BitTorrent, Bluetooth Bootstrap Protocol ("BOOTP"), Domain Name System ("DNS"), Dynamic Host Configuration Protocol ("DHCP"), Ethernet, file transfer protocol ("FTP"), hypertext transfer protocol ("HTTP"), infrared communication standards (e.g., IrDA or IrSimple), transmission control protocol/internet protocol ("TCP/IP") (e.g., any of the protocols used in each of the TCP/IP layers), real-time transport protocol ("RTP"), real-time streaming protocol ("RTSP"), Simple Mail Transfer Protocol ("SMTP"), Simple Network Management Protocol ("SNMP"), Simple Network Time Protocol ("SNTP"), secure shell protocol ("SSH"), and any other communications protocol or standard, or any combination thereof.

Communication Link. Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connection for transmission of light and (ii) wireless links such as wireless electromagnetic signals that carry information via changes made to one or more properties of electromagnetic waves.

As noted, a wireless link may be a wireless electromagnetic signal that carries information via changes made to one or more properties of an electromagnetic wave(s). A wireless electromagnetic signal may be a microwave or radio wave and may be referred to as a radio frequency or "RF" signal.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Computer. Generally speaking, a computer or computing device is a programmable machine having two principal characteristics. Namely, it responds to a set of instructions in a well-defined manner and can execute a prerecorded list of instructions (e.g., a program or routine). A computer according to the present disclosure is a device with a processor and a memory. For purposes of this disclosure, examples of a computer include a server host, a personal computer, (e.g., desktop computer, laptop computer, netbook), a mobile communications device (such as a mobile "smart" phone), and devices providing functionality through internal components or connection to an external computer, server, or global communications network (such as the Internet) to take direction from or engage in processes which are then delivered to other system components. In some embodiments, the device 205 may be referred to as a computer.

Database. Generally speaking, a "database" is an organized collection of data, generally stored and accessed electronically from a computer system. Generally, any suitable datastore may be referred to as a "database." This disclosure may describe one or more databases for storing information relating to aspects of the disclosure. The information stored on a database can, for example, relate to a private subscriber, a content provider, a host, a security provider, etc. A server (which may or may not be hosted on the same computer as the database) may act as an intermediary between the database and a client by providing data from the database to the client or enabling the client to write data to the database. One of ordinary skill in the art appreciates any reference to "a database" may refer to multiple databases, each of which may be linked to one another.

Display Device. Generally speaking, the terms "display device" or "display" refer to an electronic visual display device that provides visual output in the form of images, text, or video. Typically, a display device may be any display, screen, monitor, or projector suitable for displaying visual output (e.g., images or video output). Example displays include LED screens, LCD screens, CRT screens, projectors, heads up displays, smart watch displays, headset displays (e.g., VR goggles), etc.

Graphic User Interface (GUI). See "User Interface."

Input/Output (I/O) Interface. Generally speaking, an I/O interface of a computer system is a hardware component (e.g., an I/O controller installed on a motherboard) that communicatively connects one or more processors of the computer system to one or more input or output devices such as UI device or peripheral devices. For example, an I/O interface may couple the UI components 205*d* to the other components of the device 205. An I/O interface may receive input and output requests from a system processor, and may then send device-specific control signals to controlled devices based on the requests. An I/O interface may also receive data, requests, or commands from connected devices that are then transmitted to system processors. I/O interfaces are sometimes called device controllers. The software on a system that interacts with a device controller and that enables the device controller to control or otherwise communicate with a particular device is generally referred to as a "device driver."

Memory and Computer-Readable Media. Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Module. When used in the context of a software system, the term "module" generally refers to a set of applications, routines, or executable instructions. See also "Routine." In some instances, the term "module" refers to a component of a physical system (e.g., a car includes a number of modules, such as an engine, transmission, brakes, etc.). The context of the use of the term will make clear whether the "module" refers to a software component or non-software component.

Network. As used herein and unless otherwise specified, when used in the context of system(s) or device(s) that communicate information or data, the term "network" refers to a collection of nodes (e.g., devices or systems capable of sending, receiving or forwarding information) and links which are connected to enable telecommunication between the nodes.

A network may include dedicated routers, switches, or hubs responsible for forwarding directing traffic between nodes, and, optionally, dedicated devices responsible for configuring and managing the network. Some or all of the nodes may be also adapted to function as routers in order to direct traffic sent between other network devices. Network devices may be interconnected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiber optic cable, for example, may be capable of providing a bandwidth several orders of magnitude higher than a wireless link because of the difference in the inherent physical limitations of the medium. A network may include networks or sub-networks, such as a local area network (LAN) or a wide area network (WAN).

Node. Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Object. Generally speaking, the term "object," when used in the context of a software system, refers to a variable, a data structure, a function, a method, an instance of a class or template, or some combination thereof. An object is typically referenceable by a unique or relatively unique identifier.

Processor. The various operations of example methods described herein may be performed, at least partially, by one or more processors. Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Routine. Unless otherwise noted, a "routine," "module," or "application" described in this disclosure refers to a set of computer-readable instructions that may be stored on a CRM. For example the routine 206 shown in FIG. 2 may be a set of instructions residing on a CRM of the memory 205a. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

Each routine may be represented by code implemented in any desired language, such as source code (e.g., interpretable for execution or compilable into a lower level code), object code, bytecode, machine code, microcode, or the like. The code may be written in any suitable programming or scripting language (e.g., C, C++, Java, Actionscript, Objective-C, Javascript, CSS, Python, XML, Swift, Ruby, Elixir, Rust, Scala, or others).

Server. Generally speaking, a server is a program or set of routines that manages network resources or services to provide functionality for other programs or devices called "clients." Servers are typically hosted by a host computer, and this host computer may itself be referred to as a "server." Example servers include database servers, file servers, mail servers, print servers, web servers, game servers, and application servers. Servers may be dedicated (e.g., wherein the software and hardware are used exclusively or nearly exclusively for server functions) or virtual (e.g., wherein the server is hosted by a virtual machine on a physical machine and/or wherein the server shares hardware or software resources of a single machine with another operating system).

User Interface (UI). Generally speaking, a user interface refers to the components of a computer system by which a user and the computer system interact. The UI components may be hardware, software, or some combination thereof, and may include UI input components, UI output components, or some combination thereof. UI components may be coupled to a system via an I/O interface.

Examples of the described UI output components include: (i) visual output components such as lights (e.g., LEDs) and electronic displays (e.g., LCD, LED, CRT, plasma, projection displays, heads-up displays, etc.), (ii) audio output components such as speakers, and (iii) motion generating components such as motors that provide haptic feedback.

Examples of the described UI input components include: (i) mechanical or electrical components for detecting physical or touch input, such as hardware actuators (e.g., those used for a keyboard, a mouse, "hard" buttons found on a tablet or phone, etc.) or electrical sensors (e.g., resistive or capacitive touch sensors); (ii) audio sensors (e.g., microphones) for detecting audio input, such as voice commands; (iii) image sensors for detecting image or video input, such as those found in a camera (e.g., enabling facial recognition input or gesture input without requiring the user to touch the device); and (iv) motion sensors (e.g., accelerometers, gyroscopes, etc.) for detecting motion of the computer system itself (e.g., enabling a user to provide input by rotating or otherwise moving the computer system).

Some systems provide a graphical user interface (GUI) by way of a UI output component such as an electronic display. Generally speaking, a GUI is generated via a routine and enables a user to interact with indicators and other graphic elements displayed on at the electronic display. Generally speaking, the graphic elements of a GUI may be output elements (i.e., conveying some sort of information to the user), control elements (i.e., being user "interactable" to cause the execution of an action by the system), or both (e.g., an icon may include an image representing a browser and may be interacted with to launch the browser).

Example GUI control elements include buttons (e.g., radio buttons, check boxes, etc.), sliders, list boxes, spinner elements, drop-down lists, menus, menu bars, toolbars, interactive icons, text boxes, windows that can be moved or minimized and maximized, etc.

Generally speaking, a window is an area on the screen that displays information, with its contents being displayed independently from the rest of the screen. Generally, a menu is a list of selectable choices that a user may select to execute a corresponding command (e.g., to cause the menu to expand and display additional choices, to cause a new window to be generated, etc.). Generally, an icon is small image representing an object such as a file, an application, a web page, or a command. A user can typically interact with an icon (e.g., by single or double pressing or clicking) to execute a command, open a document, or run an application.

What is claimed is:

1. A system comprising:
one or more field devices;
a process controller coupled to the one or more field devices;
a user interface device coupled to the process controller, the user interface device configured to:
  display a GUI for designing controller configurations, the GUI including a canvas area;
  detect user input representing a user placing a set of graphic representations of function blocks in the canvas area;
  generate a draft control routine for a draft controller configuration, wherein the draft control routine includes a plurality of function blocks corresponding to the set of graphic representations, each of the plurality of function blocks including (i) at least one input for receiving values from a parameter set via the GUI, from a one of the one or more field devices, or from a one of the other function blocks; and (ii) at least one output for transmitting values to a one of the one or more field devices or to a one of the other function blocks;
  implement a preview mode by: (i) configuring at least one of the plurality of function blocks to receive a control input from a one of the one or more field devices; (ii) executing the draft control routine in a sandbox environment; and (iii) displaying one or more values of one or more parameters utilized or impacted by the draft control routine to enable the user to monitor the draft control routine during execution; and
  in response to detecting a user interaction with an element of the GUI indicating that the draft controller configuration is finalized: transmit the draft controller configuration, including the draft control routine, so that the process controller can receive the draft controller configuration and be configured to operate in accordance with the draft controller configuration.

2. The system of claim 1, wherein the user interface device is further configured to:
  (i) detect user input representing a command to inject a new value for an input or output of a function block in the draft control routine; and
  (ii) inject the new value by overriding a current value carried by the input or output so that the input or output instead carries the new value.

3. The system of claim 1, wherein the user interface device is further configured to:
  modify, based on user input, one or more logic parameters for control logic implemented by the plurality of function blocks when the draft control routine is executed.

4. The system of claim 3, wherein the user interface device is configured to modify the one or more logic parameters during the preview mode while the draft control routine is being executed.

5. The system of claim 1, wherein the user interface device is configured to transmit the draft controller configuration by: transmitting the draft controller configuration to a configuration database from which the draft controller configuration is propagated to the process controller.

6. The system of claim 1, wherein the user interface device is further configured to:
  download a current controller configuration from the process controller, the current controller configuration including a current control routine;
  implement a second preview mode by (i) executing the current control routine; and (ii) displaying values of one or more parameters utilized by the current control routine to enable monitoring of the current control routine during execution and to enable comparison to the draft control routine.

7. The system of claim 1, wherein the process controller is a first process controller from a plurality of controllers;
  wherein the user interface device is further configured to detect user input indicating that the draft controller configuration should be assigned to the first process controller;
  in response to detecting the user input indicating that the draft controller configuration should be assigned to the first process controller: assigning the draft controller configuration to the first process controller.

8. A method comprising:
displaying, at a user interface device, a GUI for designing controller configurations, the GUI including a canvas area;

detecting, at the user interface device, user input representing a set of graphic representations of function blocks placed in the canvas area;

generating, by the user interface device, a draft control routine for a draft controller configuration for a process controller, wherein the draft control routine includes a plurality of function blocks corresponding to the set of graphic representations, each of the plurality of function blocks including (i) at least one input for receiving values from a field device or from a one of the other function blocks; and (ii) at least one output for transmitting values to a field device or to one of the other function blocks;

implementing a preview mode by: (i) configuring at least one of the plurality of function blocks to receive a control input from a field device; (ii) executing the draft control routine in a sandbox environment; and (iii) displaying values of one or more parameters utilized or impacted by the draft control routine to enable monitoring of the draft control routine during execution; and in response to detecting a user interaction with an element of the GUI indicating that the draft controller configuration is finalized: transmitting the draft controller configuration, including the draft control routine, so that the process controller can receive the draft controller configuration and be configured to operate in accordance with the draft controller configuration.

9. The method of claim 8, further including:
(i) detecting user input representing a command to inject a new value for an input or output of a function block in the draft control routine; and
(ii) injecting the new value by overriding a current value carried by the input or output so that the input or output instead carries the new value.

10. The method of claim 8, further comprising:
modifying, based on user input, one or more logic parameters for control logic implemented by the plurality of function blocks when the draft control routine is executed.

11. The method of claim 10, wherein modifying the one or more logic parameters includes modifying the one or more logic parameters during the preview mode while the draft control routine is being executed.

12. The method of claim 8, wherein the user interface device is configured to transmit the draft controller configuration by: transmitting the draft controller configuration to a configuration database from which the draft controller configuration is propagated to the process controller.

13. The method of claim 8, further comprising:
implementing a second preview mode by (i) executing a current control routine of a current controller configuration downloaded from the process controller; and (ii) displaying values of one or more parameters utilized by the current control routine to enable monitoring of the current control routine during execution and to enable comparison to the draft control routine.

14. The method of claim 8, wherein the process controller is a first process controller from a plurality of controllers and wherein the method further comprises:
detecting user input indicating that the draft controller configuration should be assigned to the first process controller;
in response to detecting the user input indicating that the draft controller configuration should be assigned to the first process controller: assigning the draft controller configuration to the first process controller.

15. A system comprising:
one or more field devices;
a process controller coupled to the set of field devices;
a user interface device coupled to the process controller, the user interface device configured to:
 display a GUI for designing controller configurations, the GUI including a canvas area;
 detect user input representing a user placing a set of graphic representations of function blocks in the canvas area;
 generate a draft control routine for a draft controller configuration, wherein the draft control routine includes a plurality of function blocks corresponding to the set of graphic representations, the plurality of function blocks including:
  (i) an input block configured to receive a control input value for a control input and to forward the control input value;
  (ii) one or more control blocks linked to the input block and configured to (a) receive the control input value forwarded from the input block, and (b) transmit a control output value for a control output, wherein the control output value is set to a calculated value that is calculated by applying control logic to the control input value; and
  (iii) an output block linked to the one or more control blocks and configured to receive the control output value transmitted by the one or more control blocks and to forward the control output value;
 implement a preview mode by: (i) configuring the input block to set the value for the control input to a live value obtained by a particular field device from the one or more field devices; and (ii) executing the control logic of the one or more control blocks in a sandbox environment; and (iii) displaying one or more values of one or more parameters utilized or impacted by the draft control routine to enable monitoring of the draft control routine during execution of the control logic; and
 in response to receiving user input, transmit the draft controller configuration, including the draft control routine, so that the process controller can receive the draft controller configuration and be configured to operate in accordance with the draft controller configuration.

16. The system of claim 15, wherein the user interface device is further configured to:
(i) receive user input representing a command to inject a new value for the control input; and
(ii) inject the new value by configuring the input block or the one or more control blocks to set the control input value to the new value instead of the live value obtained by the field device.

17. The system of claim 15, wherein the user interface device is further configured to:
(i) receive user input representing a command to inject a new value for the control output; and
(ii) inject the new value by configuring the one or more control blocks or the output block to set the control output value to the new value instead of the calculated value.

18. The system of claim 15, wherein the particular field device is a first field device and where the output block is configured to forward the control output value to a second field device of the one or more field devices.

19. The system of claim 15, wherein the user interface device is further configured to:

modify, based on user input, one or more logic parameters for the control logic implemented by the one or more control blocks.

20. The system of claim 19, wherein the user interface device is configured to modify the one or more logic parameters during the preview mode while the control routine is being executed.

21. The system of claim 15, wherein the user interface device is configured to transmit the draft controller configuration by: transmitting the draft controller configuration to a configuration database from which the draft controller configuration is propagated to the process controller.

22. The system of claim 15, wherein the user interface device is further configured to:
  download a current controller configuration from the process controller, the current controller configuration including a current control routine;
  implement a second preview mode by (i) executing the current control routine; and (ii) displaying values of one or more parameters utilized by the current control routine to enable monitoring of the current control routine during execution and to enable comparison to the draft control routine.

23. A method comprising:
  displaying a GUI for designing controller configurations, the GUI including a canvas area;
  detecting user input representing a user placing a set of graphic representations of function blocks in the canvas area;
  generating a draft control routine for a draft controller configuration, wherein the draft control routine includes a plurality of function blocks corresponding to the set of graphic representations, the plurality of function blocks including:
    (i) an input block configured to receive a control input value for a control input and to forward the control input value;
    (ii) one or more control blocks linked to the input block and configured to (a) receive the control input value forwarded from the input block, and (b) transmit a control output value for a control output, wherein the control output value is set to a calculated value that is calculated by applying control logic to the control input value; and
    (iii) an output block linked to the one or more control blocks and configured to receive the control output value transmitted by the one or more control blocks and to forward the control output value;
  implementing a preview mode by: (i) configuring the input block to set the value for the control input to a live value obtained by a particular field device; and (ii) executing the control logic of the one or more control blocks in an environment local to the user interface device; and (iii) displaying one or more values of one or more parameters utilized or impacted by the draft control routine to enable monitoring of the draft control routine during execution of the control logic; and
  in response to receiving user input, transmitting the draft controller configuration, including the draft control routine, so that a process controller can receive the draft controller configuration and be configured to operate in accordance with the draft controller configuration.

24. The method of claim 23, further comprising:
  (i) receiving user input representing a command to inject a new value for the control input; and
  (ii) injecting the new value by configuring the input block or the one or more control blocks to set the control input value to the new value instead of the live value obtained by the field device.

25. The method of claim 23, wherein the particular field device is a first field device and where the output block is configured to forward the control output value to a second field device.

26. The method of claim 23, wherein transmitting the draft controller configuration comprises: transmitting the draft controller configuration to a configuration database from which the draft controller configuration is propagated to the process controller.

27. The method of claim 23, further comprising:
  downloading a current controller configuration from the process controller, the current controller configuration including a current control routine;
  implementing a second preview mode by (i) executing a current control routine of a current controller configuration downloaded from the process controller; and (ii) displaying values of one or more parameters utilized by the current control routine to enable monitoring of the current control routine during execution and to enable comparison to the draft control routine.

* * * * *